(12) United States Patent
Choi et al.

(10) Patent No.: US 11,948,484 B2
(45) Date of Patent: Apr. 2, 2024

(54) ELECTRONIC DEVICE AND METHOD FOR PREDICTING AND COMPENSATING FOR BURN-IN OF DISPLAY

(71) Applicant: Samsung Electronics Co., Ltd., Suwon-si (KR)

(72) Inventors: Seungkyu Choi, Suwon-si (KR); Hanyuool Kim, Suwon-si (KR); Taehyeong Kim, Suwon-si (KR); Yunpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/328,202

(22) Filed: Jun. 2, 2023

(65) Prior Publication Data

US 2023/0306884 A1    Sep. 28, 2023

Related U.S. Application Data

(63) Continuation of application No. PCT/KR2021/014471, filed on Oct. 18, 2021.

(30) Foreign Application Priority Data

Dec. 4, 2020   (KR) .................. 10-2020-0168977
Feb. 2, 2021   (KR) .................. 10-2021-0014605

(51) Int. Cl.
*G09G 3/00*       (2006.01)
*G06F 1/16*       (2006.01)
*G09G 3/3208*     (2016.01)

(52) U.S. Cl.
CPC ........... *G09G 3/006* (2013.01); *G06F 1/1652* (2013.01); *G09G 3/035* (2020.08); *G09G 3/3208* (2013.01); *G09G 2320/046* (2013.01)

(58) Field of Classification Search
CPC ...... G09G 3/006; G09G 3/035; G09G 3/3208; G09G 2320/046; G09G 2310/0232;
(Continued)

(56) References Cited

U.S. PATENT DOCUMENTS 6,989,636 B2 *  1/2006  Cok ...................... G09G 3/3225
                                                   315/169.3
11,145,249 B1 * 10/2021  Han ........................ G09G 3/32
(Continued)

FOREIGN PATENT DOCUMENTS

KR        20100021482 A      2/2010
KR        20160057504 A      5/2016
(Continued)

OTHER PUBLICATIONS

International Search Report for PCT/KR2021/014471 dated Jan. 10, 2022, 3 pages.
(Continued)

*Primary Examiner* — Jonathan A Boyd
(74) *Attorney, Agent, or Firm* — Nixon & Vanderhye, P.C.

(57) ABSTRACT

An electronic device with a rollable display may include the operations of: obtaining global burn-in information and local burn-in information according to a designated sampling period; on the basis of the result of analyzing the global burn-in information, predicting whether burn-in will at least partially occur in the entire area of a display area; when burn-in is predicted to at least partially occur in a boundary area, generating a first compensation map including pieces of local compensation data calculated to correspond to m block areas of the boundary area, respectively; when burn-in is predicted to at least partially occur in an area remaining after excluding the boundary area from the entire area, generating a second compensation map including pieces of
(Continued)

global compensation data calculated to correspond to n block areas of the entire area, respectively; and controlling the rollable display to display image data compensated on the basis of the first compensation map or the second compensation map.

20 Claims, 26 Drawing Sheets

(58) Field of Classification Search
CPC ..... G09G 2320/0233; G09G 2320/048; G09G 3/3225; G06F 1/1652; G06F 1/16
See application file for complete search history.

(56) References Cited

U.S. PATENT DOCUMENTS

| | | | |
|---|---|---|---|
| 11,735,147 B1* | 8/2023 | Chou | ..................... G09G 5/391 345/76 |
| 2008/0315788 A1 | 12/2008 | Levey et al. | |
| 2009/0046089 A1* | 2/2009 | Zhuang | ................ G09G 3/3208 345/214 |
| 2016/0140895 A1 | 5/2016 | Park et al. | |
| 2017/0004753 A1* | 1/2017 | Kim | ..................... G09G 3/3233 |
| 2017/0213493 A1 | 7/2017 | Han | |
| 2017/0309226 A1 | 10/2017 | In et al. | |
| 2018/0350296 A1* | 12/2018 | Thompson | ............ G06F 3/0673 |
| 2021/0183334 A1* | 6/2021 | Holland | ................ G09G 5/001 |

FOREIGN PATENT DOCUMENTS

| | | |
|---|---|---|
| KR | 20170005329 A | 1/2017 |
| KR | 20170122313 A | 11/2017 |
| KR | 20200113532 A | 10/2020 |
| KR | 102425795 B1 | 7/2022 |

OTHER PUBLICATIONS

Written Opinion of the ISA for PCT/KR2021/014471 dated Jan. 10, 2022, 3 pages.

* cited by examiner

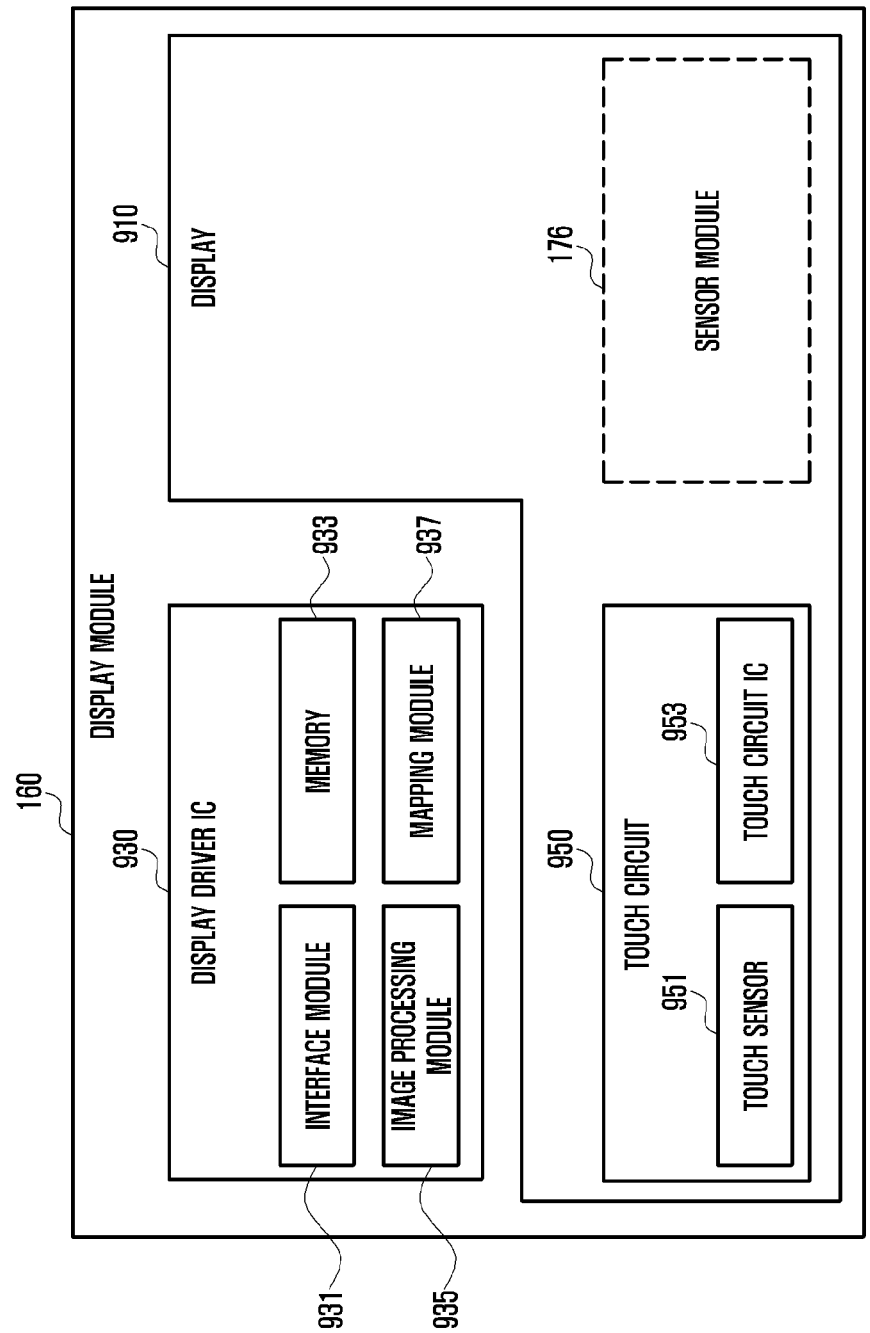

ELECTRONIC DEVICE AND METHOD FOR PREDICTING AND COMPENSATING FOR BURN-IN OF DISPLAY

CROSS-REFERENCE TO RELATED APPLICATIONS

This application is a continuation of International Application No. PCT/KR2021/014471, designating the United States, filed on Oct. 18, 2021, in the Korean Intellectual Property Receiving Office, and claiming priority to Korean Patent Application No. 10-2020-0168977 filed on Dec. 4, 2020, and to Korean Patent Application No. 10-2021-0014605 filed on Feb. 2, 2021, in the Korean Intellectual Property Office, the disclosures of all of which are hereby incorporated by reference herein in their entireties.

BACKGROUND

Field

Embodiments of disclosure relate to an electronic device including a rollable display.

Description of Related Art

An electronic device has been deviated from the uniform rectangular shape, and has been gradually changed to various shapes. For example, researches and developments for an electronic device having a rollable display (or flexible display) have been actively in progress.

By applying a rollable display, the electronic device has been researched and developed to have a form factor capable of folding, bending, rolling, or unfolding the display.

An organic light emitting diode (OLED) may be applied to a rollable display. For example, a display panel of the rollable display may have the flexible characteristic, and pixels of the display panel may include the OLED.

On the display panel including the OLED, a so-called burn-in phenomenon in which afterimage or stain remains on the screen may occur. The burn-in of the display panel may occur due to deviation of a driving time (e.g., cumulative light emitting time) of the OLED for each of a plurality of pixels.

SUMMARY

Embodiments of the disclosure may provide an electronic device including a rollable display and/or a method for predicting and compensating for a burn-in phenomenon of the rollable display.

The technical subject to be achieved is not limited to that as described above, and other unmentioned technical subjects can be clearly understood by those of ordinary skill in the art to which the disclosure pertains from the following description.

Additional aspects may be partially explained in the following description, may be partially clear from the explanation, or may be understood by the proposed embodiments.

According to embodiments of the disclosure, an electronic device may include: a housing; a rollable display configured to be supported by the housing and provided with a display area whose area is adjusted in interworking with a movement of at least a part of the housing in a first direction, the rollable display including a first area fixedly exposed to an outside and a second area variably exposed to the outside in interworking with the movement of the housing; a memory configured to store therein burn-in information of the rollable display, the memory including a first memory area configured to store global burn-in information corresponding to n designated block areas divided from a whole area of the display area including the first area and the second area, and a second memory area configured to store local burn-in information corresponding to m designated block areas divided from a boundary area located on a boundary between the first area and the second area of the rollable display and having a designated width; and a processor, wherein the processor is configured to: obtain the global burn-in information and the local burn-in information for each designated sampling period and store the global burn-in information and the local burn-in information in the first memory area and the second memory area, respectively, predict whether a burn-in occurs at least partly in the whole area of the display area based on a result of analyzing the global burn-in information, predict whether the burn-in occurs at least partly in the boundary area of the display area based on a result of analyzing the local burn-in information, generate a first compensation map including local compensation data calculated to correspond to the m block areas if it is predicted that the burn-in occurs at least partly in the boundary area, generate a second compensation map including global compensation data calculated to correspond to the n block areas if it is predicted that the burn-in occurs at least partly in a remaining area of the whole area excluding the boundary area, and control the rollable display to display compensated image data based on the first compensation map or the second compensation map.

According to embodiments of the disclosure, a method may be provided for driving an electronic device, including a rollable display provided with a display area whose area is adjusted in interworking with a movement of at least a part of a housing in a first direction, the rollable display including a first area fixedly exposed to an outside and a second area variably exposed to the outside in interworking with the movement of the housing; and a memory including a first memory area configured to store global burn-in information corresponding to n designated block areas divided from a whole area of the display area including the first area and the second area and a second memory area configured to store local burn-in information corresponding to m designated block areas divided from a boundary area located on a boundary between the first area and the second area of the rollable display and having a designated width, where the method may include: obtaining the global burn-in information and the local burn-in information for each designated sampling period and storing the global burn-in information and the local burn-in information in the first memory area and the second memory area, respectively; predicting whether a burn-in occurs at least partly in the whole area of the display area based on a result of analyzing the global burn-in information; predicting whether the burn-in occurs at least partly in the boundary area of the display area based on a result of analyzing the local burn-in information; generating a first compensation map including local compensation data calculated to correspond to the m block areas if it is predicted that the burn-in occurs at least partly in the boundary area; generating a second compensation map including global compensation data calculated to correspond to the n block areas if it is predicted that the burn-in occurs at least partly in a remaining area of the whole area excluding the boundary area; and controlling the rollable display to display compensated image data based on the first compensation map or the second compensation map.

According to the electronic device and/or the method, since the burn-in phenomenon of the rollable display is pre-predicted and/or compensated for, defects in that after-image and/or stain remains on the screen can be reduced.

In addition, various effects being grasped directly or indirectly through the document can be provided.

BRIEF DESCRIPTION OF DRAWINGS

Other aspects, advantages, and prominent features of the disclosure will become clear to those skilled in the art from the following detailed description that discloses various example embodiments together with the accompanying drawings, in which:

FIG. 9 is a block diagram of a display module according to various example embodiments.

Throughout the entire drawings, it is to be understood that similar reference numerals designate similar components, constituent elements, and structures.

DETAILED DESCRIPTION

The following description with reference to the accompanying drawings is provided to help comprehensive understanding of an embodiment of the disclosure as defined by the claims and equivalents thereof. Here, although various specific details are included herein to help the understanding, they should be regarded as merely exemplary. Accordingly, those of ordinary skill in the art to which the disclosure pertains will be able to perceive that various modifications and corrections of an embodiment described in the description can be made without departing from the scope and idea of the disclosure. Further, for clarity and simplicity, explanation of well-known functions and constitutions may be omitted.

The terms and words used in the following description and claims are not limited to bibliographic meanings, but the inventor just uses them to enable clear and consistent understanding of the disclosure. Accordingly, it should be apparent to those skilled in the art that the following description of various example embodiments is not intended to limit the disclosure as defined in the appended claims and the equivalents thereof, but is provided for illustrative purposes only.

Unless clearly indicated otherwise in the context, it should be understood that expressions in a singular form include a plurality of indication targets. Accordingly, for example, mentions about "constituent element surfaces" may include mentions about one or more of such surfaces.

Figure 1:
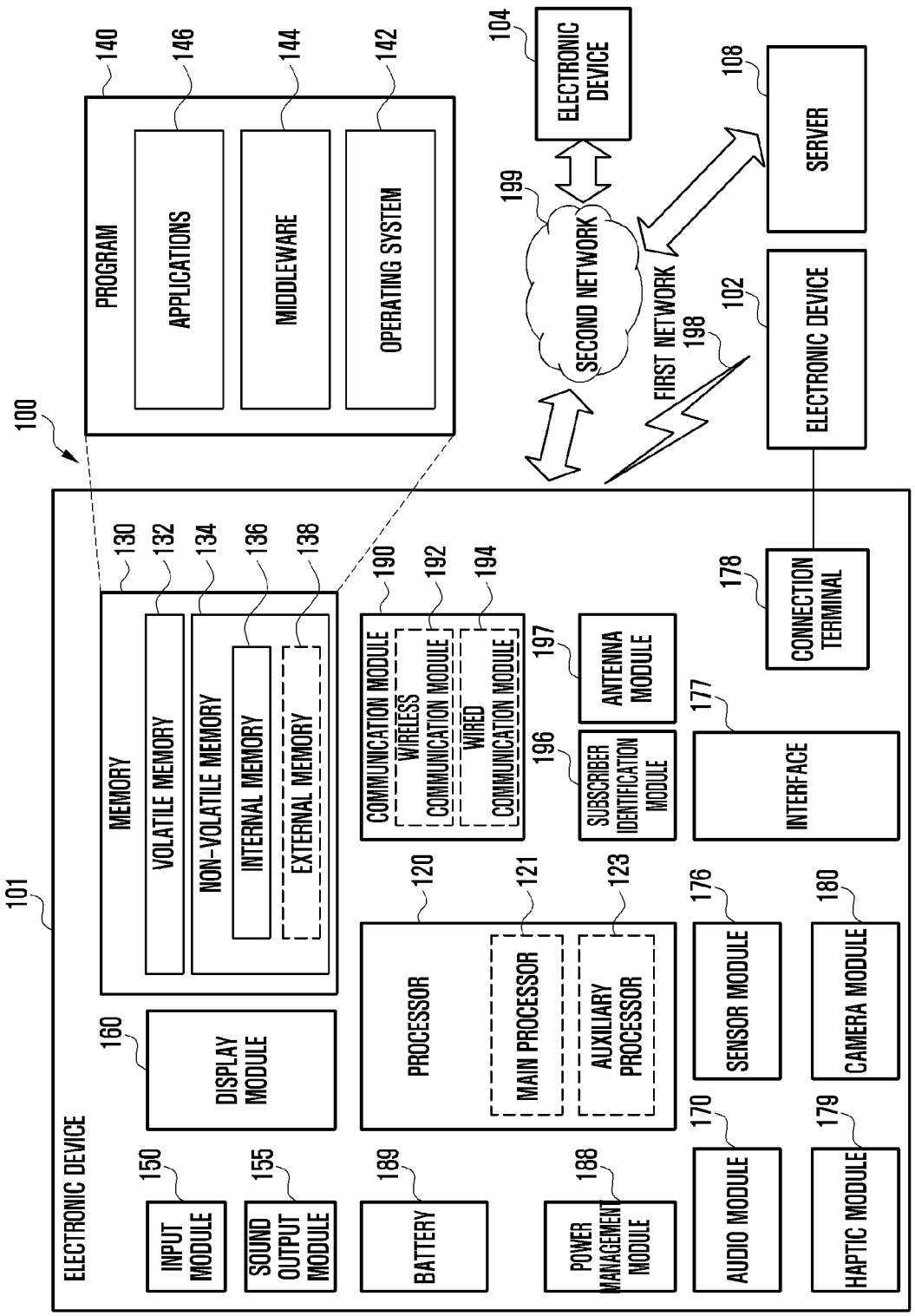
FIG. 1 is a block diagram of an electronic device in a network environment according to various example embodiments.

FIG. 1 is a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting/connection terminal 178, a haptic module 179, a camera module 180, a power management module 188, a battery 189, a communication module 190, a subscriber identification module (SIM) 196, or an antenna module 197. In some embodiments, at least one of the components (e.g., the connecting/connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application(s) 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected, directly or indirectly, with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and/or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. Each processor herein, of course, comprises processing circuitry.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
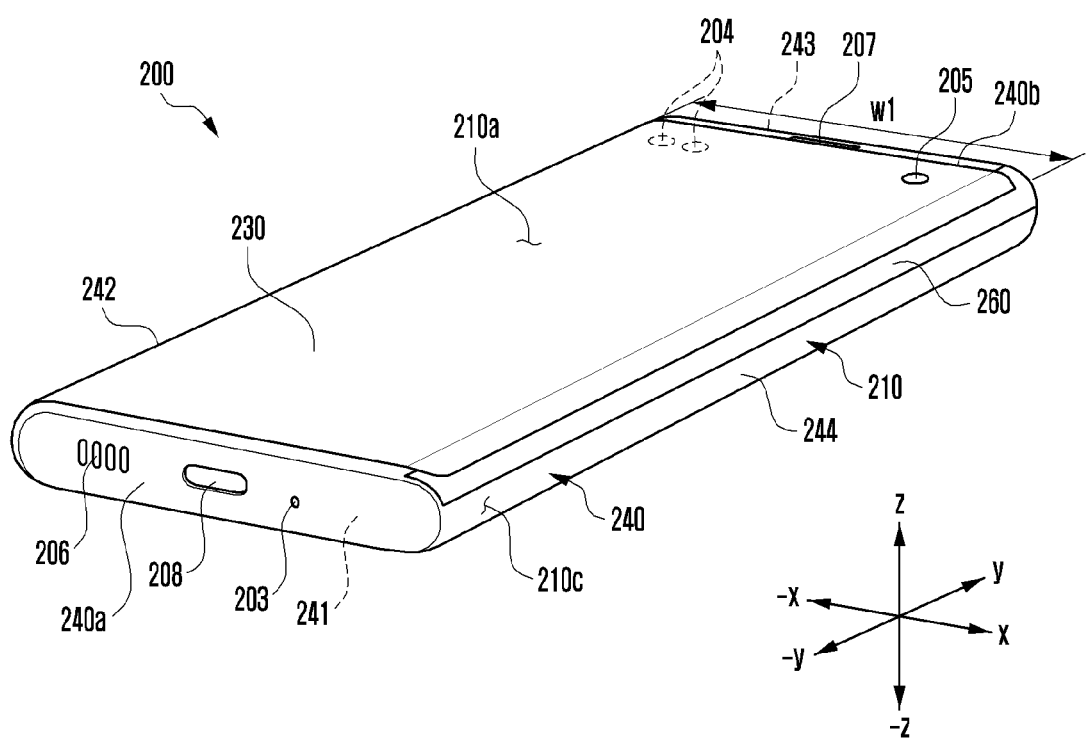
FIG. 2A is a front perspective view of an electronic device illustrating a first state according to embodiments of the disclosure.
Figure 2B:
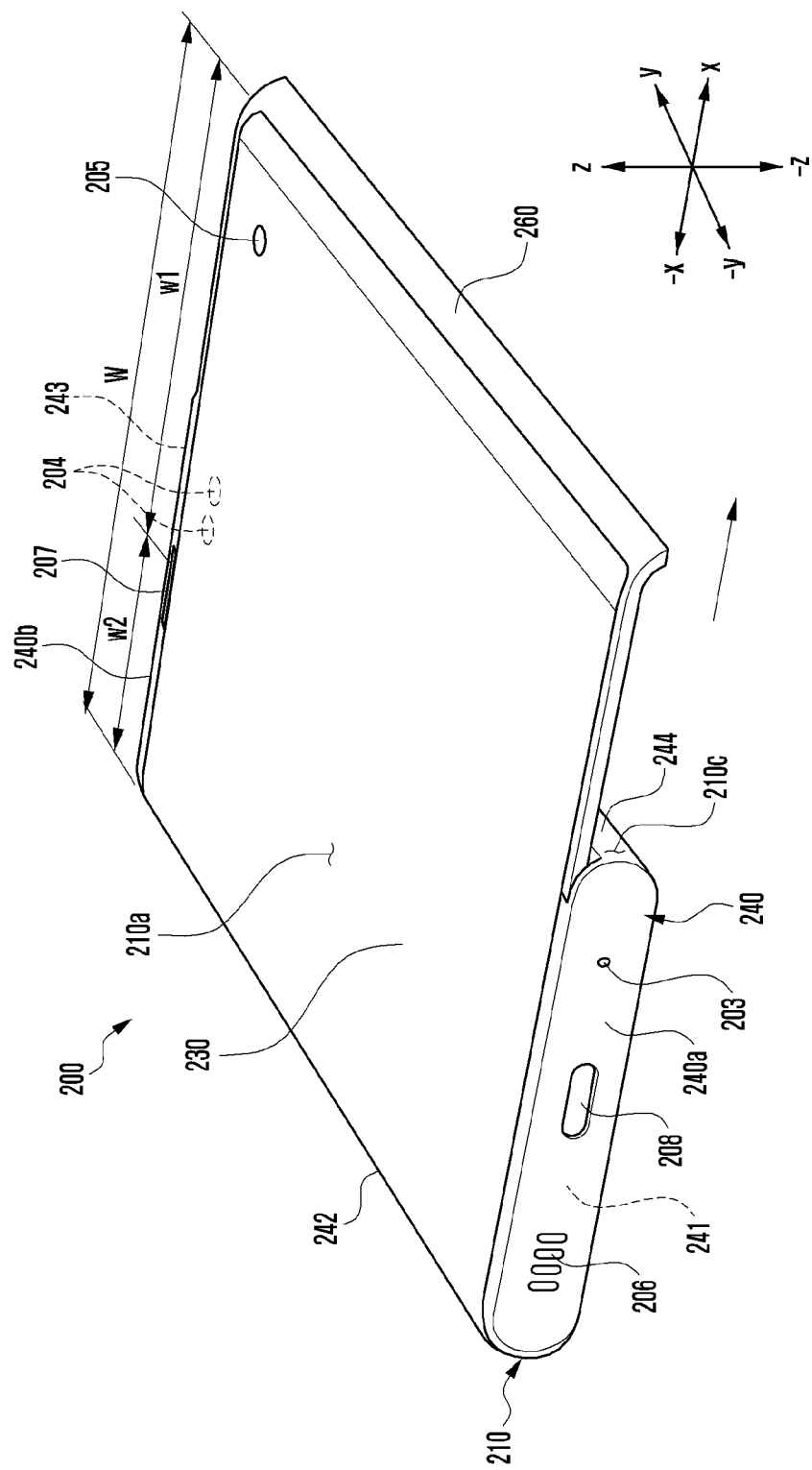
FIG. 2B is a front perspective view of an electronic device illustrating a second state according to embodiments of the disclosure.
Figure 3A:
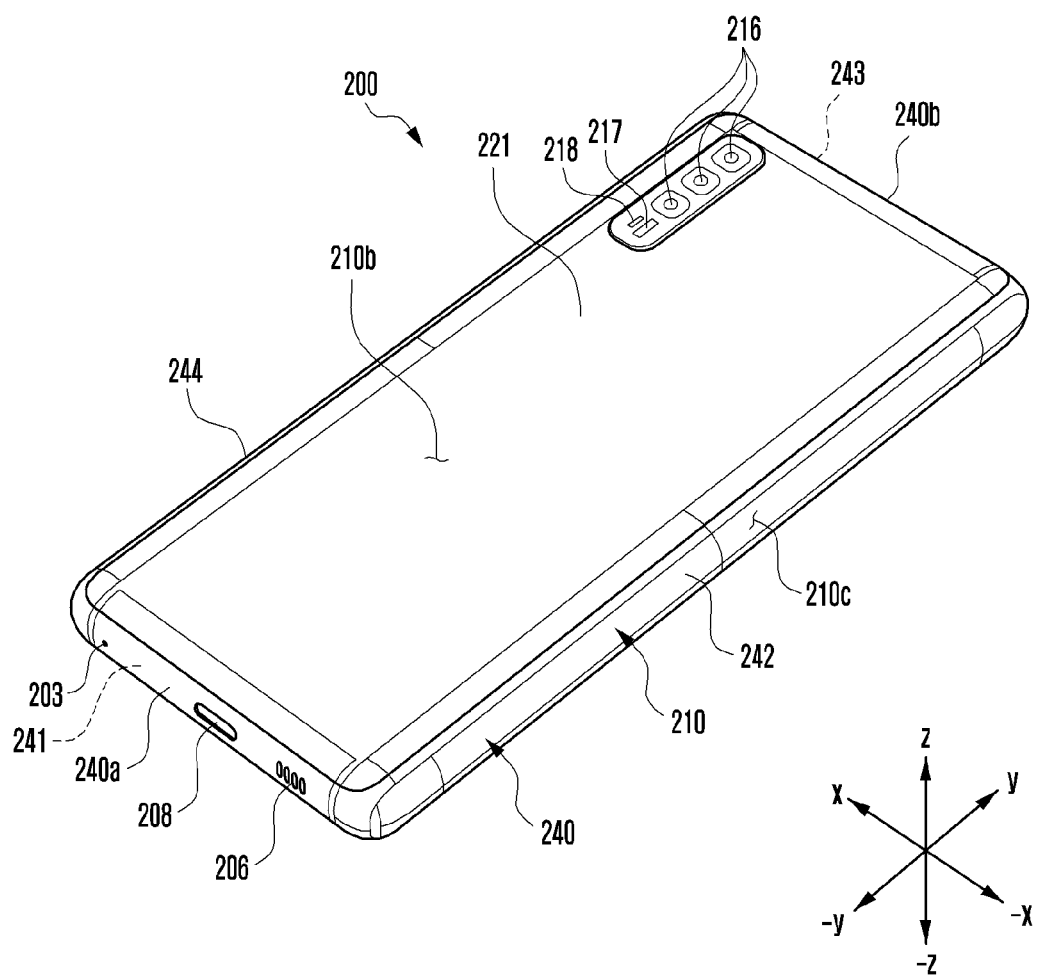
FIG. 3A is a rear perspective view of an electronic device illustrating a first state according to embodiments of the disclosure.
Figure 3B:
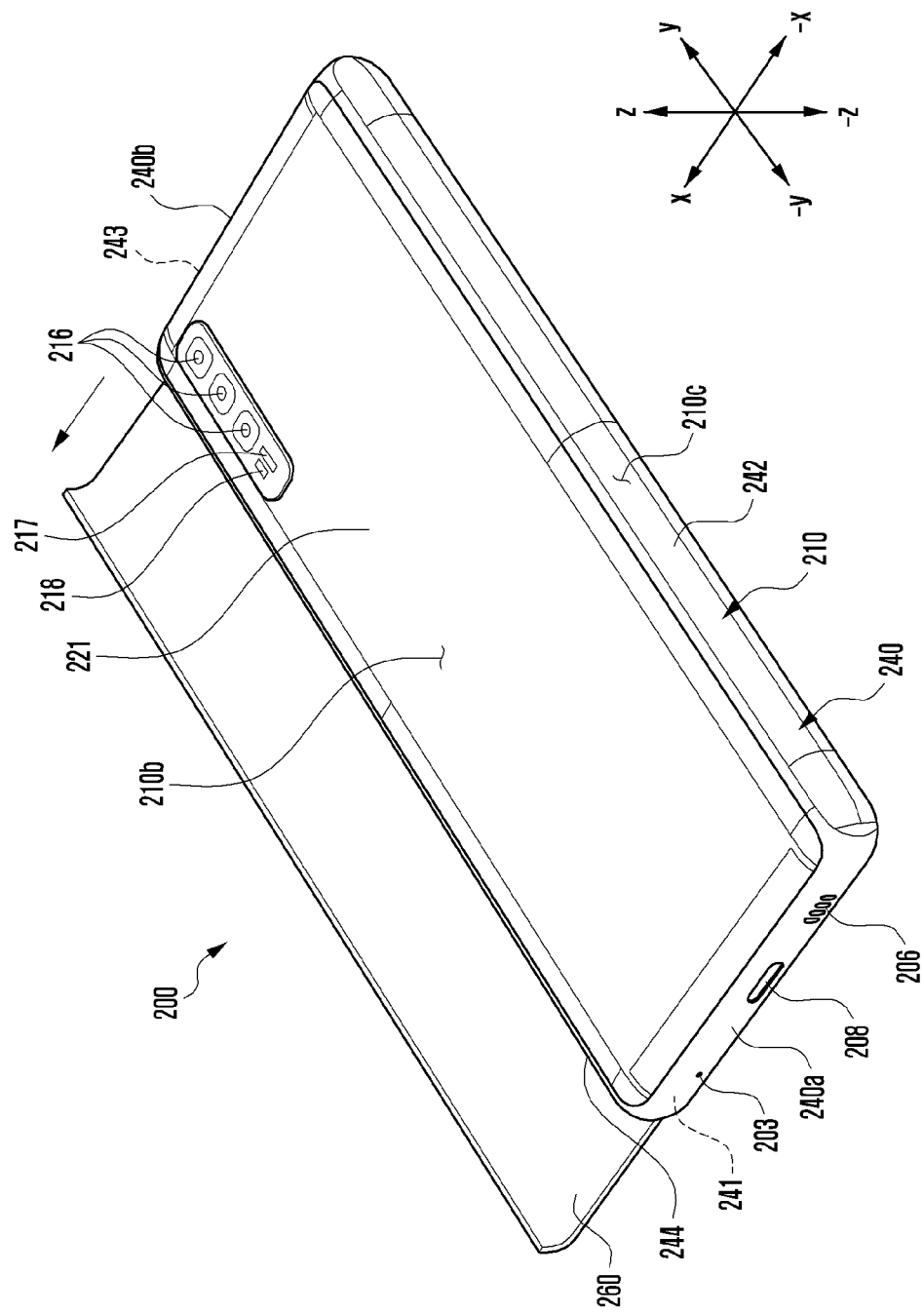
FIG. 3B is a rear perspective view of an electronic device illustrating a second state according to embodiments of the disclosure.

FIGS. 2A and 2B are front perspective views of an electronic device 200 illustrating a first state and a second state according to embodiments of the disclosure. FIGS. 3A and 3B are rear perspective views of an electronic device 200 illustrating a first state and a second state according to embodiments of the disclosure.

The electronic device 200 of FIG. 2A may be similar to the electronic device 101 of FIG. 1 at least partly, or may further include other embodiments of the electronic device.

With reference to FIGS. 2A to 3B, the electronic device 200 may include a housing (e.g., side frame) 240, and a slide plate 260 movably combined with the housing 240 at least partly and configured to support at least a part of a flexible display 230. According to an embodiment, the slide plate 260 may include a bendable hinge rail (e.g., hinge rail 261 of FIG. 4) combined with an end part of the slide plate 260. For example, while the slide plate 260 performs a sliding operation in the housing 240, the hinge rail (e.g., hinge rail 261 of FIG. 4) may enter into an inner space (e.g., inner space 2403 of FIG. 4) of the housing 240 while supporting the flexible display 230. According to an embodiment, the electronic device 200 may include a housing structure 210 including a front surface 210a (e.g., first surface) directed in a z-axis direction (e.g., third direction), a rear surface 210b (e.g., second surface) directed in a −z-axis direction (e.g., fourth direction) that is opposite to the z-axis direction, and a lateral surface 210c surrounding a space between the front surface 210a and the rear surface 210b and being at least partly exposed to outside. According to an embodiment, the rear surface 210b may be formed through a rear cover 221 combined with the housing 240. According to an embodiment, the rear cover 221 may be formed of polymer, coated or colored glass, ceramic, metal (e.g., aluminum, stainless steel (STS), or magnesium), or a combination of at least two of the above-described materials. In a certain embodiment, the rear cover 221 may be integrally formed with the housing 240. According to an embodiment, at least a part of the lateral surface 210c may be disposed to be exposed to the outside through the housing 240.

According to an embodiment, the housing 240 may include a first lateral surface 241 having a first length, a second lateral surface 242 extending from the first lateral surface 241 in a vertical direction and having a second length that is longer than the first length, a third lateral surface 243 extending from the second lateral surface 242 in parallel to the first lateral surface 241 and having the first length, and a fourth lateral surface 244 extending from the third lateral surface 243 in parallel to the second lateral surface 242 and having the second length. According to an embodiment, the slide plate 260 may support the flexible display 230, and may be open from the second lateral surface 242 in the direction (e.g., x-axis direction or first direction) of the fourth lateral surface 244 to extend the display area of the flexible display 230, or may be closed from the fourth lateral surface 244 in the direction (e.g., −x-axis direction or second direction) of the second lateral surface 242 to reduce the display area of the flexible display 230. According to an embodiment, the electronic device 200 may include a first lateral cover 240a and a second lateral cover 240b for covering the first lateral surface 241 and the third lateral surface 243. According to an embodiment, the first lateral surface 241 and the third lateral surface 243 may be disposed not to be exposed to the outside through the first lateral cover 240a and the second lateral cover 240b.

According to an embodiment, the electronic device 200 may include the flexible display 230 disposed to be supported by the slide plate 260. According to an embodiment, the flexible display 230 may include a first area (e.g., first area 231 of FIG. 4) supported by the slide plate 260, and a second area (e.g., second area 232 of FIG. 4) extending from the first area 231 and supported by a hinge rail 261. According to an embodiment, the second area 232 of the flexible display 230 may be disposed to enter into the inner space (e.g., inner space 2403 of FIG. 4) of the housing 240 and not to be exposed to the outside in a state where the electronic device 200 is in a first state (e.g., a closed state or a state where the slide plate 260 enters into the housing 240), and may be exposed to the outside so as to extend from the first area 231 as being supported by the hinge rail 261 in a state where the electronic device 200 is in a second state (e.g., an open state or a state where the slide plate 260 is drawn out from the housing 240).

Accordingly, the electronic device 200 may include a rollable type electronic device in which the area of the display screen of the flexible display 230 is changed in accordance with the movement of the slide plate 260 from the housing 240.

According to an embodiment, the electronic device 200 may be named a "slidable electronic device 200" or an "expandable electronic device 200" since the display area of the flexible display 230 is expanded based on the slide movement of the slide plate 260 from the housing 240, or may be named a "rollable electronic device 200" since at least a part of the flexible display 230 is designed to be wound in the inner space (e.g., inner space 2403 of FIG. 4) of the housing 240 in the first state.

According to an embodiment, the first state may be called a first shape, and the second state may be called a second shape. For example, the first shape may include a normal state, a reduced state, or a closed state, and the second shape may include an open state. In an embodiment, the electronic device 200 may form a third state (e.g., an intermediate state) that is a state between the first state and the second state. For example, the third state may be called a third shape, and the third shape may include a free stop state.

According to an embodiment, the slide plate 260 may be movably combined with the housing 240 in a sliding manner so as to enter into or to be drawn out from the housing 240. For example, the electronic device 200 may be constituted to have a first width w1 from the second lateral surface 242 to the fourth lateral surface 244 in the first state. According to an embodiment, the electronic device 200 may have a second width w2 in which the hinge rail 261 entering into the inside of the housing 240 moves out of the electronic device in the second state. The second width w2 may be larger than the first width w1.

According to an embodiment, the slide plate 260 may be operated through user's manipulation. In a certain embodiment, the slide plate 260 may be automatically operated through a driving mechanism disposed in the inner space (e.g., inner space 2403 of FIG. 4) of the housing 240. According to an embodiment, if an event for an open/closed state transition (e.g., transition between the first state and the second state) of the electronic device 200 is detected through the processor (e.g., processor 120 of FIG. 1), the electronic device 200 may be configured to control the operation of the slide plate 260 through the driving mechanism. In a certain embodiment, the processor (e.g., processor 120 of FIG. 1) of the electronic device 200 may display objects in various ways to correspond to the changed display area of the flexible display 230 depending on the first state, the second state, or the third state (e.g., intermediate state), and may control to execute an application program.

According to an embodiment, the electronic device 200 may include at least one of an input device 203, sound output devices 206 and 207, sensor modules 204 and 217, camera modules 205 and 216, a connector port 208, a key input device (not illustrated), or an indicator (not illustrated). As another embodiment, the electronic device 200 may omit at least one of the above-described constituent elements, or may additionally include other constituent elements.

According to an embodiment, the input device 203 may include a microphone 203. In a certain embodiment, the input device 203 may include a plurality of microphones 203 disposed to be able to detect the direction of a sound. The sound output devices 206 and 207 may include speakers 206 and 207. The speakers 206 and 207 may include an external speaker 206 and a receiver 207 for calls. As another embodiment, the sound output devices 206 and 207 may include a speaker (e.g., piezo-electric speaker) that operates in a state where a separate speaker hole 206 is excluded.

According to an embodiment, the sensor modules 204 and 217 may generate an electrical signal or a data value corresponding to an internal operation state of the electronic device 200 or an external environment state. The sensor modules 204 and 217 may include, for example, a first sensor module 204 (e.g., proximity sensor or illumination sensor) disposed on the front surface of the electronic device and/or a second sensor module 217 (e.g., HRM sensor) disposed on the rear surface of the electronic device. According to an embodiment, the first sensor module 204 may be disposed under the flexible display 230 on the front surface of the electronic device. According to an embodiment, the first sensor module 204 may further include at least one of a proximity sensor, an illumination sensor 204, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a bio-sensor, a temperature sensor, or a humidity sensor.

According to an embodiment, the camera devices 205 and 216 may include a first camera device 205 disposed on the front surface of the electronic device 200 and a second camera device 216 disposed on the rear surface of the electronic device 200. According to an embodiment, the electronic device 200 may include a flash 218 located near the second camera device 216. According to an embodiment, each of the camera devices 205 and 216 may include one or a plurality of lenses, an image sensor, and/or an image signal processor. According to an embodiment, the first camera device 205 may be disposed under the flexible display 230, and may be configured to photograph a subject through a part of an activation area of the flexible display 230. According to an embodiment, the flash 218 may include, for example, a light-emitting diode or a xenon lamp. In a certain embodiment, two or more lenses (wide angle and telephoto lenses) and image sensors may be disposed on one surface of the electronic device 200.

According to an embodiment, the electronic device 200 may include at least one antenna (not illustrated). According to an embodiment, the at least one antenna, for example, may wirelessly communicate with an external electronic device (e.g., electronic device 104 of FIG. 1), or may wirelessly transmit/receive a power required for charging. According to an embodiment, the antenna may include a legacy antenna, an mmWave antenna, a near field communication (NFC) antenna, a wireless charging antenna, and/or a magnetic secure transmission (MST) antenna.

According to an embodiment, the housing 240 (e.g., lateral frame) may be at least partly formed of a conductive material (e.g., metal material). According to an embodiment, at least the first lateral surface 241 and/or the third lateral surface 243 of the housing 240, which is not involved in driving of the slide plate 260, may be formed of a conductive material. The housing 240 may be divided into a plurality of conductive parts that are electrically insulated from each other through a non-conductive material. According to an embodiment, the plurality of conductive parts may be electrically connected, directly or indirectly, to a wireless communication circuit (e.g., wireless communication module 192 of FIG. 1) disposed inside the electronic device 200, and thus may be utilized as antennas that operate in various frequency bands.

Figure 4:
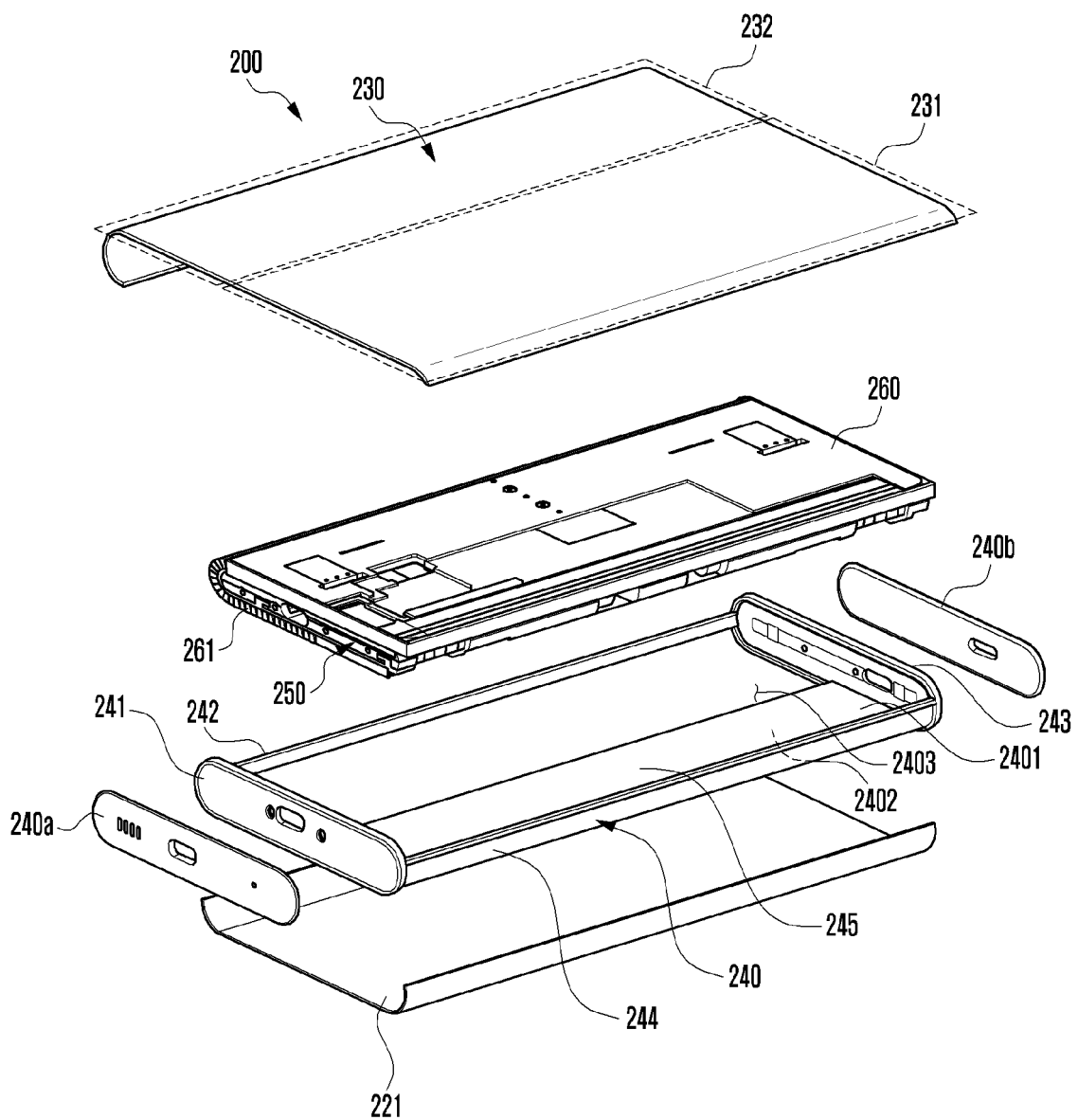
FIG. 4 is an exploded perspective view of an electronic device according to embodiments of the disclosure.

FIG. 4 is an exploded perspective view of an electronic device 200 according to an embodiment.

With reference to FIG. 4, an electronic device 200 may include a housing 240 including a first surface 2401, a second surface 2402 directed in an opposite direction to the first surface 2401, and a lateral surface (e.g., lateral surface 210c of FIG. 2A) surrounding an inner space 2403 between the first surface 2401 and the second surface 2402, a bracket housing 250 disposed to face the first surface 2401 in the inner space 2403 of the housing 240, a slide plate 260 including a hinge rail 261 slidably combined with the bracket housing 250, a flexible display 230 disposed to be supported by the slide plate 260 and the hinge rail 261, and a rear cover 221 disposed to face the second surface 2402.

According to an embodiment, the flexible display 230 may include a first area 231 supported by the slide plate 260, and a second area 232 extending from the first area 231 and supported by the hinge rail 261.

According to an embodiment, the housing 240 may include a support plate 245 extending at least partly from at least one lateral surface (e.g., fourth lateral surface 244) into the inner space 2403. According to an embodiment, the support plate 245 may be formed to have a structure for supporting electronic components (e.g., bracket housing 250) disposed in the inner space of the electronic device 200. In a certain embodiment, the support plate 245 may be structurally combined with the housing 240. According to an embodiment, the housing 240 may include a first lateral surface 241 having a first length, a second lateral surface 242 extending from the first lateral surface 241 in a vertical direction and having a second length that is longer than the first length, a third lateral surface 243 extending from the second lateral surface 242 in parallel to the first lateral surface 241 and having the first length, and a fourth lateral surface 244 extending from the third lateral surface 243 in parallel to the second lateral surface 242 and having the second length.

According to an embodiment, the electronic device 200 may include a first lateral cover 240a and a second lateral cover 240b for covering the first lateral surface 241 and the third lateral surface 243. According to an embodiment, the first lateral surface 241 and the third lateral surface 243 may be disposed not to be exposed to the outside through the first lateral cover 240a and the second lateral cover 240b.

In a certain embodiment, in a state where the second area 232 of the flexible display 230 enters into the inner space 2403 of the housing 240 (e.g., slide-in state), at least a part of the second area 232 may be disposed to be seen from the outside through the rear cover 221. In this case, the rear cover 221 may be formed of a transparent material and/or a semitransparent material.

Figure 5A:
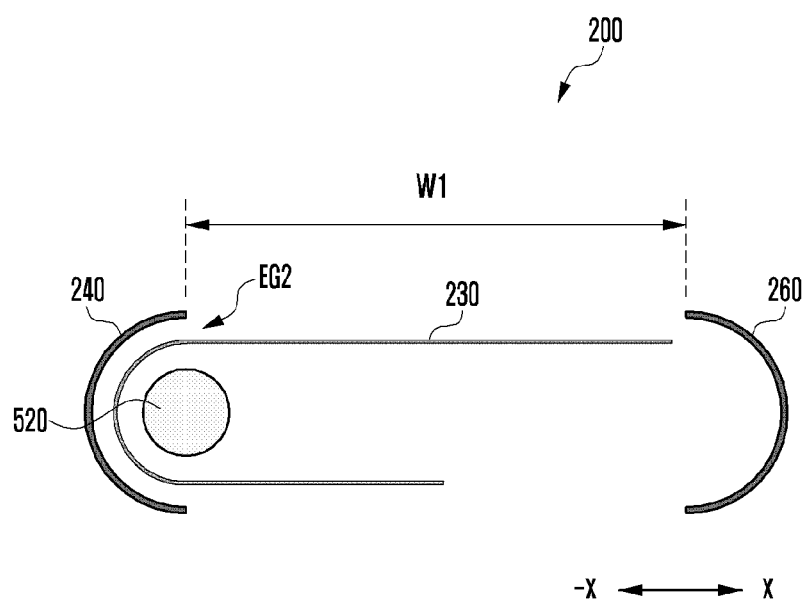
FIG. 5A is a cross-sectional view illustrating a first state of an electronic device in which a roller is located in a second direction (−x-axis direction) of the electronic device according to an example embodiment.
Figure 5B:
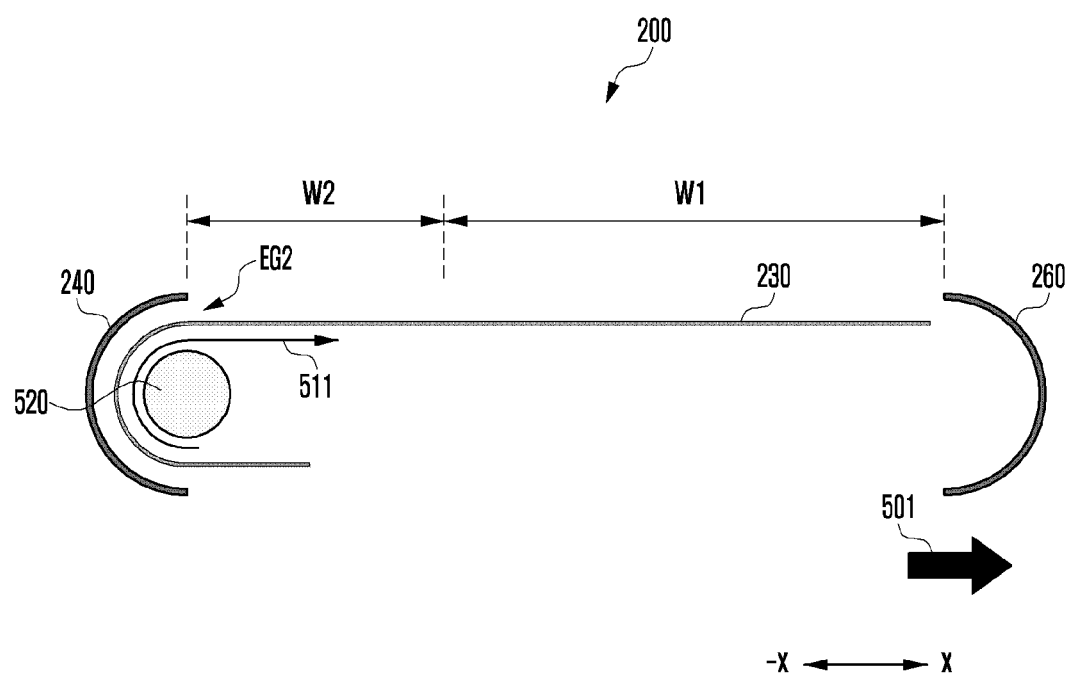
FIG. 5B is a cross-sectional view illustrating a second state of an electronic device in which a roller is located in a second direction (−x-axis direction) of the electronic device according to an example embodiment.

FIG. 5A is a cross-sectional view illustrating a first state of an electronic device in which a roller is located in a second direction (−x-axis direction) of the electronic device according to an example embodiment. FIG. 5B is a cross-sectional view illustrating a second state of an electronic device in which a roller is located in a second direction (−x-axis direction) of the electronic device according to an example embodiment.

The electronic device 200 illustrated in FIGS. 5A and 5B may be at least partly similar to the electronic device 200 illustrated in FIGS. 2A to 4, or may further include other embodiments of the electronic device 200. Hereinafter, with reference to FIGS. 5A and 5B, only features that are different from those of the electronic device 200 illustrated in FIGS. 2A to 4 or unexplained features will be described.

With reference to FIGS. 5A and 5B, the electronic device 200 according to an embodiment may include the housing 240, and the slide plate 260 that is extendable from the housing 240 in the first direction (x-axis direction). In the document, the housing 240 may be a first housing 240, and the slide plate 260 may be a second housing 260.

According to an embodiment, the electronic device 200 may include a roller 520. The roller 520 may be disposed in the inner space (e.g., inner space 2403 of FIG. 4) of the housing 240.

According to an embodiment, the roller 520 may be located in the second direction (−x-axis direction) of the electronic device, and may be rotated in a designated direction based on the movement of the slide plate 260. According to an embodiment, the roller 520 may be located adjacent to the second lateral surface (e.g., second lateral surface 242 of FIG. 4) of the electronic device 200.

According to an embodiment, the roller 520 may be rotated clockwise in interworking with the movement of the slide plate 260 in the first direction (x-axis direction). The roller 520 may be rotated counterclockwise in interworking with the movement of the slide plate 260 in the second direction (−x-axis direction).

According to an embodiment, the display area of the flexible display 230 may be varied in interworking with the rotation of the roller 520.

For example, as illustrated in FIG. 5A, the roller 520 may be rotated counterclockwise in interworking with the movement of the slide plate 260 in the second direction (−x-axis direction). If the roller 520 is rotated counterclockwise, at least a part (e.g., second area 232 of FIG. 4) of the flexible display 230 may slide into an inside of the housing 240 through a second edge part EG2 located in the second direction (−x-axis direction) of the electronic device 200. The second edge part EG2 may be a part of the housing 240 adjacent to the second lateral surface (e.g., second lateral surface 242 of FIG. 4) of the electronic device 200. According to an embodiment, if the at least a part (e.g., second area 232) of the flexible display 230 slides into the inside of the housing 240, the display area of the flexible display 230 may have a first width W1. For example, as illustrated in FIG. 5A, the display area of the flexible display 230 may have the first width W1 in the first state of the electronic device 200.

For example, as illustrated in FIG. 5B, the roller 520 may be rotated clockwise in interworking with the movement 501 of the slide plate 260 in the first direction (x-axis direction). If the roller 520 is rotated clockwise, as indicated by an arrow 511 in FIG. 5B, at least a part (e.g., second area 232, as shown in FIG. 4) of the flexible display 230 located inside the housing 240 may slide out through the second edge part EG2 located in the second direction (−x-axis direction) of the electronic device 200. According to an embodiment, if the at least a part (e.g., second area 232) of the flexible display 230 slides out from the inside of the housing 240, the display area of the flexible display 230 may have a width that is a sum of the first width W1 and the second width W2. For example, as illustrated in FIG. 5B, the display area of the flexible display 230 may have the width that is the sum of the first width W1 and the second width W2 in the second state of the electronic device 200.

According to an embodiment, as illustrated in FIGS. 5A and 5B, at least one part (e.g., second area 232 of FIG. 4) of the flexible display 230 having been slid into the inside of the housing 240 in the first state of the electronic device 200 may be disposed side by side with another part (e.g., first area 231 of FIG. 4) of the flexible display 230 exposed out of the housing 240.

Figure 6A:
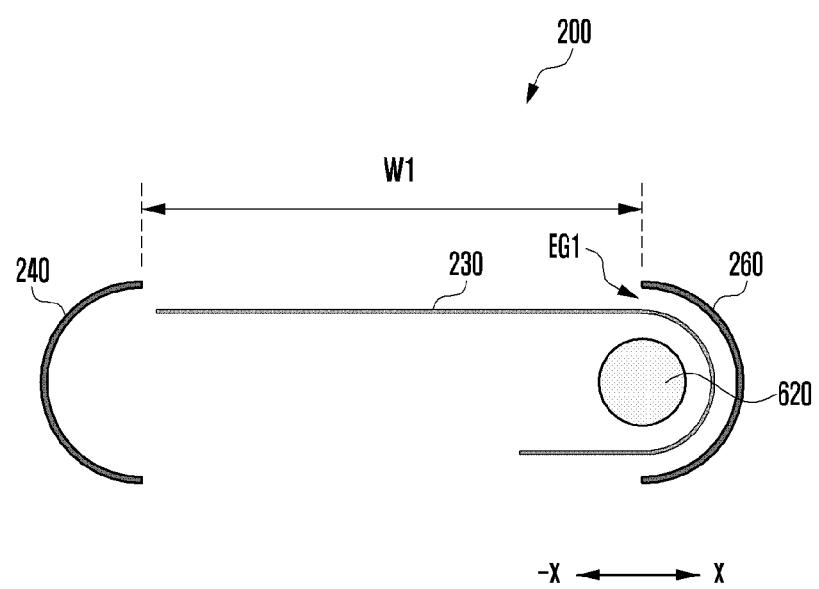
FIG. 6A is a cross-sectional view illustrating a first state of an electronic device in which a roller is located in a first direction (x-axis direction) of the electronic device according to an example embodiment.
Figure 6B:
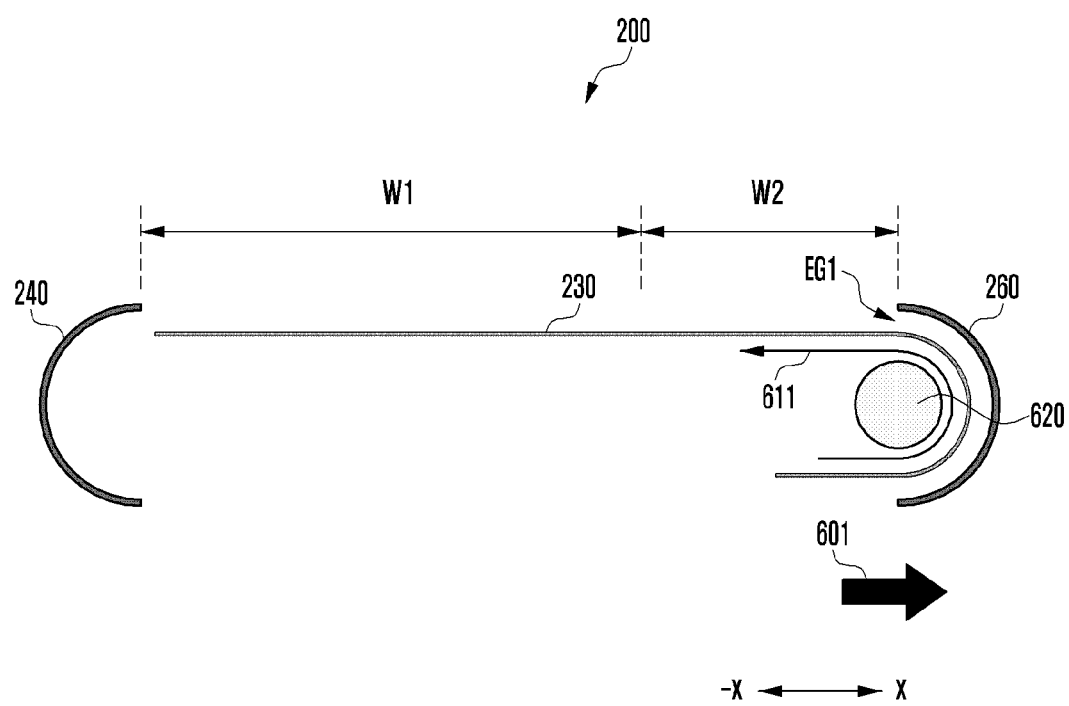
FIG. 6B is a cross-sectional view illustrating a second state of an electronic device in which a roller is located in a first direction (x-axis direction) of the electronic device according to an example embodiment.

FIG. 6A is a cross-sectional view illustrating a first state of an electronic device in which a roller is located in a first direction (x-axis direction) of the electronic device according to an example embodiment. FIG. 6B is a cross-sectional view illustrating a second state of an electronic device in which a roller is located in a first direction (x-axis direction) of the electronic device according to an example embodiment.

The electronic device 200 illustrated in FIGS. 6A and 6B may be at least partly similar to the electronic device 200 illustrated in FIGS. 2A to 4, or may further include other embodiments of the electronic device 200. Hereinafter, with reference to FIGS. 6A and 6B, only features that are different from those of the electronic device 200 illustrated in FIGS. 2A to 4 or unexplained features will be described.

With reference to FIGS. 6A and 6B, the electronic device 200 according to an embodiment may include the housing 240, and the slide plate 260 that is extendable from the housing 240 in the first direction (x-axis direction). In the document, the housing 240 may be a first housing 240, and the slide plate 260 may be a second housing 260.

According to an embodiment, the electronic device 200 may include a roller 620. The roller 620 may be disposed in the inner space (e.g., inner space 2403 of FIG. 4) of the housing 240.

According to an embodiment, the roller 620 may be located in the first direction (x-axis direction) of the electronic device, and may be rotated in a designated direction based on the movement of the slide plate 260. According to an embodiment, the roller 620 may be located adjacent to the fourth lateral surface (e.g., fourth lateral surface 244 of FIG. 4) of the electronic device 200.

According to an embodiment, the roller 620 may be rotated counterclockwise in interworking with the movement of the slide plate 260 in the first direction (x-axis direction). The roller 620 may be rotated clockwise in interworking with the movement of the slide plate 260 in the second direction (−x-axis direction).

According to an embodiment, the display area of the flexible display 230 may be varied in interworking with the rotation of the roller 620.

For example, as illustrated in FIG. 6A, the roller 620 may be rotated clockwise in interworking with the movement of the slide plate 260 in the second direction (−x-axis direction). If the roller 620 is rotated clockwise, at least a part (e.g., second area 232) of the flexible display 230 may slide into the inside of the housing 240 through a first edge part EG1 located in the first direction (x-axis direction) of the electronic device 200. The first edge part EG1 may be a part of the slide plate 260 adjacent to the fourth lateral surface (e.g., fourth lateral surface 244 of FIG. 4) of the electronic device 200. According to an embodiment, if the at least a part (e.g., second area 232) of the flexible display 230 slides into the inside of the housing 240, the display area of the flexible display 230 may have the first width W1. For example, as illustrated in FIG. 6A, the display area of the flexible display 230 may have the first width W1 in the first state of the electronic device 200.

For example, as illustrated in FIG. 6B, the roller 620 may be rotated counterclockwise in interworking with the movement 601 of the slide plate 260 in the first direction (x-axis direction). If the roller 620 is rotated counterclockwise, as indicated by an arrow 611 in FIG. 6B, at least a part (e.g., second area 232 of FIG. 4) of the flexible display 230 located inside the housing 240 may slide out through the first edge part EG1 located in the first direction (x-axis direction) of the electronic device 200. According to an embodiment, if the at least a part (e.g., second area 232) of the flexible display 230 slides out from the inside of the housing 240, the display area of the flexible display 230 may have a width that is a sum of the first width W1 and the second width W2. For example, as illustrated in FIG. 6B, the display area of the flexible display 230 may have the width that is the sum of the first width W1 and the second width W2 in the second state of the electronic device 200.

Figure 7A:
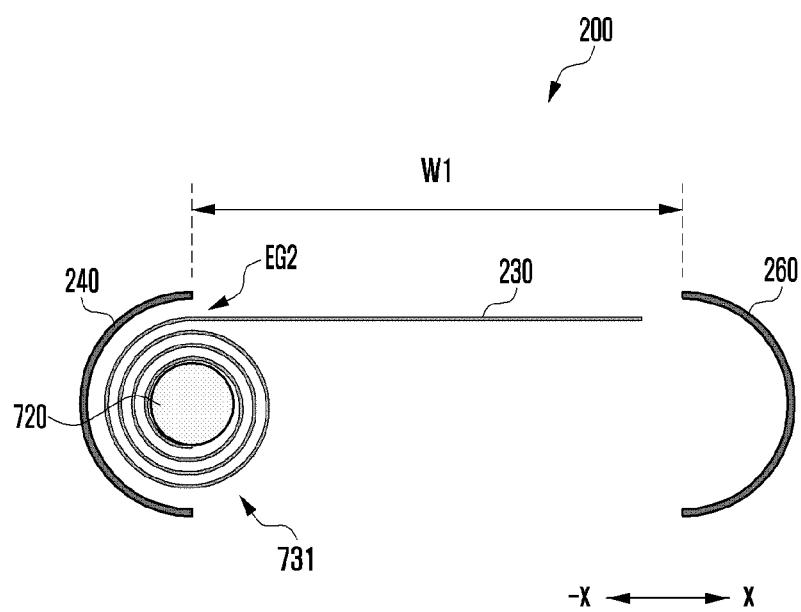
FIG. 7A is a cross-sectional view illustrating a first state of an electronic device in which a roller is located in a second direction (−x-axis direction) of the electronic device according to an example embodiment.
Figure 7B:
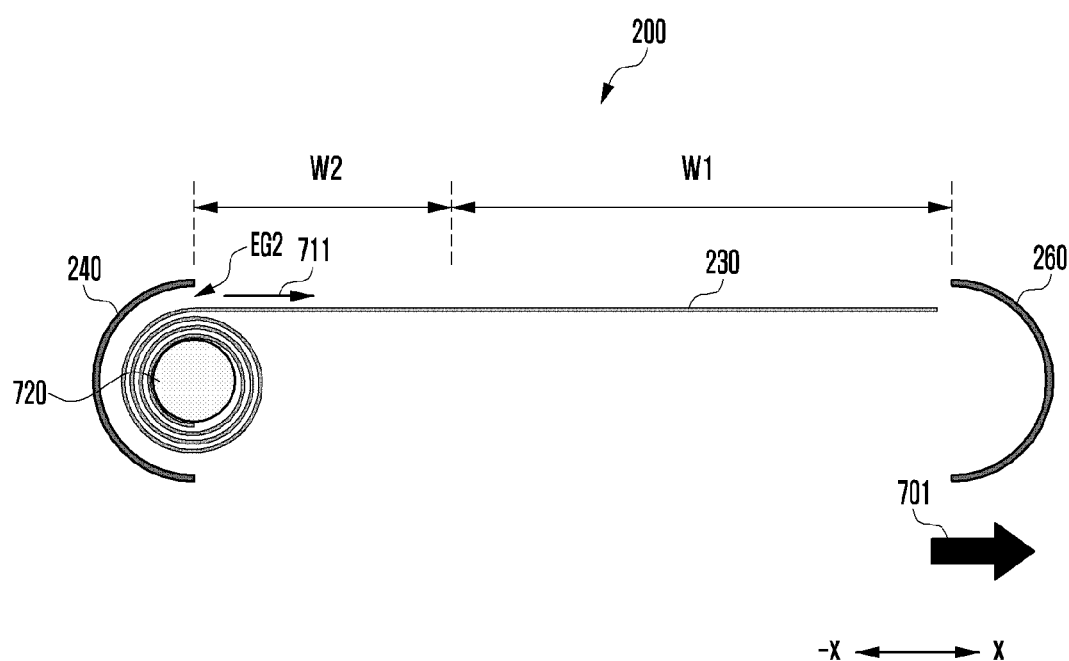
FIG. 7B is a cross-sectional view illustrating a second state of an electronic device in which a roller is located in a second direction (−x-axis direction) of the electronic device according to an example embodiment.

FIG. 7A is a cross-sectional view illustrating a first state of an electronic device in which a roller is located in a second direction (-x-axis direction) of the electronic device according to an example embodiment. FIG. 7B is a cross-sectional view illustrating a second state of an electronic device in which a roller is located in a second direction (-x-axis direction) of the electronic device according to an example embodiment.

The electronic device 200 illustrated in FIGS. 7A and 7B may be at least partly similar to the electronic device 200 illustrated in FIGS. 5A and 5B, or may further include other embodiments of the electronic device 200. Hereinafter, with reference to FIGS. 7A and 7B, only features that are different from those of the electronic device 200 illustrated in FIGS. 5A and 5B or unexplained features will be described.

With reference to FIGS. 7A and 7B, the electronic device 200 according to an embodiment may include a roller 720, and the roller 720 may be disposed in the inner space (e.g., inner space 2403 of FIG. 4) of the housing 240.

According to an embodiment, the roller 720 may be located in the second direction (-x-axis direction) of the electronic device 200, and may be rotated in a designated direction based on the movement of the slide plate 260. According to an embodiment, the roller 720 may be located adjacent to the second lateral surface (e.g., second lateral surface 242 of FIG. 4) of the electronic device 200.

According to an embodiment, the roller 720 may be rotated clockwise in interworking with the movement 701 of the slide plate 260 in the first direction (x-axis direction). The roller 720 may be rotated counterclockwise in interworking with the movement of the slide plate 260 in the second direction (-x-axis direction).

According to an embodiment, as illustrated in FIG. 7A, at least a part (e.g., second area 232 of FIG. 4) of the flexible display 230 may slide into an inside of the housing 240 in interworking with the rotation of the roller 720 counterclockwise. According to an embodiment, at least a part of the flexible display 230 may be wound along an outer circumferential surface of the roller 720 as indicated at 731 while sliding into the inside of the housing 240. For example, the at least a part of the flexible display 230 may be wound in a jelly roll form on the outer circumferential surface of the roller 720 in the first state of the electronic device 200.

According to an embodiment, as indicated by an arrow 711 in FIG. 7B, at least a part (e.g., second area 232 of FIG. 4) of the flexible display 230 may slide out of the inside of the housing 240 in interworking with the rotation of the roller 720 clockwise. For example, the at least a part of the flexible display 230 that is wound along the outer circumferential surface of the roller 720 may slide out of the housing 240 in interworking with the rotation of the roller 720 clockwise.

Figure 8A:
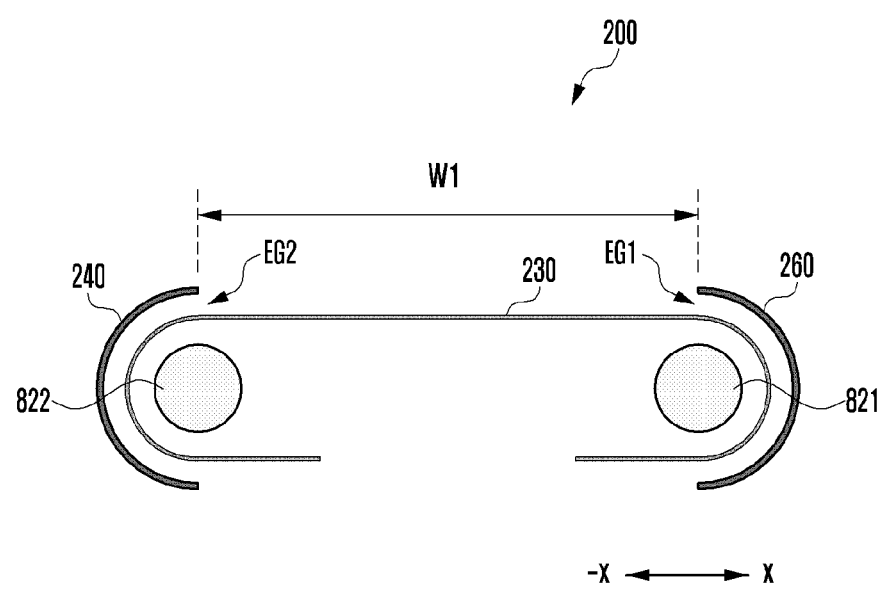
FIG. 8A is a cross-sectional view illustrating a first state of an electronic device in which rollers are located in a first direction (x-axis direction) and in a second direction (−x-axis direction) of the electronic device according to an example embodiment.
Figure 8B:
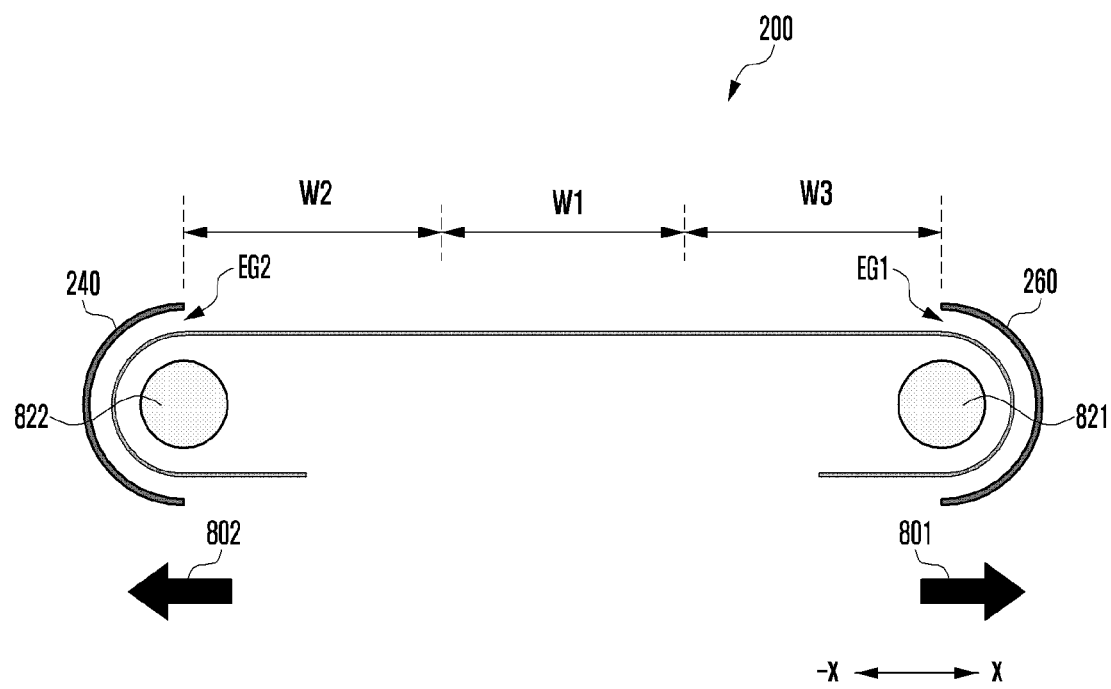
FIG. 8B is a cross-sectional view illustrating a second state of an electronic device in which rollers are located in a first direction (x-axis direction) and in a second direction (−x-axis direction) of the electronic device according to an example embodiment.

FIG. 8A is a cross-sectional view illustrating a first state of an electronic device in which rollers are located in a first direction (x-axis direction) and in a second direction (-x-axis direction) of the electronic device according to an example embodiment. FIG. 8B is a cross-sectional view illustrating a second state of an electronic device in which rollers are located in a first direction (x-axis direction) and in a second direction (-x-axis direction) of the electronic device according to an example embodiment.

The electronic device 200 illustrated in FIGS. 8A and 8B may be at least partly similar to the electronic device 200 illustrated in FIGS. 2A to 4, or may further include other embodiments of the electronic device 200. Hereinafter, with reference to FIGS. 8A and 8B, only features that are different from those of the electronic device 200 illustrated in FIGS. 2A to 4 or unexplained features will be described.

With reference to FIGS. 8A and 8B, the electronic device 200 according to an embodiment may include a first housing 240 that is extendable in the second direction (-x-axis direction) and a second housing 260 that is extendable in the first direction (x-axis direction).

According to an embodiment, the electronic device 200 may include a first roller 821 and a second roller 822, and the first roller 821 and the second roller 822 may be disposed in the inner space (e.g., inner space 2403 of FIG. 4) of the housing 240.

According to an embodiment, the first roller 821 may be located in the first direction (x-axis direction) of the electronic device 200, and may be rotated in a designated direction based on the movement of the second housing 260. According to an embodiment, the first roller 821 may be located adjacent to the fourth lateral surface (e.g., fourth lateral surface 244 of FIG. 4) of the electronic device 200.

According to an embodiment, the first roller 821 may be rotated clockwise in interworking with the movement of the second housing 260 in the second direction (-x-axis direction). For example, as illustrated in FIG. 8A, if the first roller 821 is rotated clockwise, at least a part of the flexible display 230 may slide into the inside of the second housing 260 through a first edge part EG1. The first edge part EG1 may be a part of the second housing 260 adjacent to the fourth lateral surface (e.g., fourth lateral surface 244 of FIG. 4) of the electronic device 200.

According to an embodiment, the first roller 821 may be rotated counterclockwise in interworking with the movement 801 of the second housing 260 in the first direction (x-axis direction). For example, as illustrated in FIG. 8B, if the first roller 821 is rotated counterclockwise, at least a part of the flexible display 230 may slide out from the inside of the second housing 260 through the first edge part EG1. According to an embodiment, as the at least a part of the flexible display 230 slides out through the first edge part EG1, the display area of the flexible display 230 may be increased as large as the third width W3 in the first direction (x-axis direction).

According to an embodiment, the second roller 822 may be rotated counterclockwise in interworking with the movement of the first housing 240 in the first direction (x-axis direction). For example, as illustrated in FIG. 8A, if the first roller 821 is rotated counterclockwise, at least a part of the flexible display 230 may slide into the inside of the first housing 240 through the second edge part EG2. The second edge part EG2 may be a part of the first housing 240 adjacent to the second lateral surface (e.g., second lateral surface 242 of FIG. 4) of the electronic device 200.

According to an embodiment, the second roller 822 may be rotated clockwise in interworking with the movement 802 of the first housing 240 in the second direction (−x-axis direction). For example, as illustrated in FIG. 8B, if the second roller 822 is rotated clockwise, at least a part of the flexible display 230 may slide out of the inside of the first housing 240 through the second edge part EG2. According to an embodiment, as the at least a part of the flexible display 230 slides out through the second edge part EG2, the display area of the flexible display 230 may be increased as large as the second width W2 in the second direction (−x-axis direction).

With reference to FIG. 8A, if at least a part (e.g., second area 232) of the flexible display 230 slides into the inside of the first housing 240 and/or the second housing 260, the display area of the flexible display 230 may have the first width W1. For example, as illustrated in FIG. 8A, the display area of the flexible display 230 may have the first width W1 in the first state of the electronic device 200.

With reference to FIG. 8B, if at least a part (e.g., second area 232) of the flexible display 230 slides out of the inside of the first housing 240 and the second housing 260, the display area of the flexible display 230 may have a width that is the sum of the first width W1, the second width W2, and the third width W3. For example, as illustrated in FIG. 8B, the display area of the flexible display 230 may have the width that is the sum of the first width W1, the second width W2, and the third width W3 in the second state of the electronic device 200.

FIG. 9 is a block diagram of a display module 160 according to various embodiments. With reference to FIG. 9, the display module 160 may include a display 910, and a display driver IC (DDI) 930 for controlling the display 910. The DDI 930 may include an interface module 931, a memory 933 (e.g., buffer memory), an image processing module 935, or a mapping module 937. The DDI 930 may receive, for example, image data or image information including an image control signal corresponding to a command for controlling the image data from other constituent elements of the electronic device 101 through the interface module 931. For example, according to an embodiment, the image information may be received from a processor 120 (e.g., main processor 121) (e.g., application processor) or an auxiliary processor 123 (e.g., graphic processing device) operating independently of the function of the main processor 121. The DDI 930 may communicate with a touch circuit 950 or a sensor module 176 through the interface module 931. Further, the DDI 930 may store at least a part of the received image information in the memory 933, for example, in the unit of a frame. For example, the image processing module 935 may perform preprocessing or post-processing (e.g., resolution, brightness, or size adjustment) of at least a part of the image data at least based on the characteristic of the image data or the characteristic of the display 910. The mapping module 937 may generate a voltage value or a current value corresponding to the image data preprocessed or post-processed through the image processing module 935. According to an embodiment, the generation of the voltage value or the current value may be performed based on, for example, at least a part of attributes (e.g., arrangement of pixels (RGB stripe or pentile structure) or sizes of subpixels) of pixels of the display 910. Since at least some pixels of the display 910 are driven, for example, based on at least some of the voltage values or current values, visual information (e.g., text, image, or icon) corresponding to the image data may be displayed through the display 910.

According to an embodiment, the display module 160 may further include a touch circuit 950. The touch circuit 950 may include a touch sensor 951 and a touch sensor IC 953 for controlling the touch sensor 951. For example, the touch sensor IC 953 may control the touch sensor 951 for sensing a touch input or a hovering input for a specific location of the display 910. For example, the touch sensor IC 953 may sense the touch input or the hovering input by measuring a change of a signal (e.g., voltage, quantity of light, resistance, or quantity of electric charge) for the specific location of the display 910. The touch sensor IC 953 may provide information (e.g., location, area, pressure, or time) on the sensed touch input or hovering input. According to an embodiment, at least a part (e.g., touch sensor IC 953) of the touch circuit 950 may be included as a part of the display driver IC 930 or the display 910 or as a part of other constituent elements (e.g., auxiliary processor 123 as shown in FIG. 1) disposed outside the display module 160.

According to an embodiment, the display module 160 may further include at least one sensor (e.g., fingerprint sensor, iris sensor, pressure sensor, or illumination sensor) of the sensor module 176 or a corresponding control circuit. In this case, the at least one sensor or the corresponding control circuit may be embedded in a part (e.g., display 910 or DDI 930) of the display module 160 or a part of the touch circuit 950. For example, if the sensor module 176 embedded in the display module 160 includes a biosensor (e.g., fingerprint sensor), the biosensor may obtain bio information (e.g., fingerprint image) related to the touch input through a partial area of the display 910. As another example, if the sensor module 176 embedded in the display module 160 includes a pressure sensor, the pressure sensor may obtain pressure information related to the touch input through a part or the whole of the area of the display 910. According to an embodiment, the touch sensor 951 or the sensor module 176 may be disposed between pixels of a pixel layer of the display 910 or on or under the pixel layer.

According to embodiments of the disclosure, an electronic device (e.g., electronic device 101 of FIG. 1) may include: a housing (e.g., housing 240 of FIG. 2); a rollable display (e.g., rollable/flexible display 230 of FIG. 2) configured to be supported by the housing 240 and provided with a display area whose area is adjusted in interworking with a movement of at least a part of the housing 240 in a first direction, the rollable display (e.g., rollable/flexible display 230 of FIG. 4) including a first area (e.g., first area 231 of FIG. 4) fixedly exposed to an outside and a second area (e.g., second area 232 of FIG. 4) variably exposed to the outside in interworking with the movement of the housing 240; a memory (e.g., memory 130 of FIG. 1) configured to store therein burn-in information of the rollable/flexible display 230, the memory including a first memory area (e.g., first memory area 1011 of FIG. 10) configured to store global burn-in information corresponding to n designated block areas divided from a whole area 1210 (e.g., see FIG. 11) of the display area including the first area 231 and the second area 232, and a second memory area (e.g., second memory area 1012 of FIG. 10) configured to store local burn-in information corresponding to m designated block areas divided from a boundary area 1110 (e.g., see FIG. 11) located on a boundary between the first area 231 and the second area 232 of the rollable display 230 and having a designated width; and a processor (e.g., processor 120 of FIG. 1), wherein the processor 120 is configured to: obtain the global burn-in information and the local burn-in information for each designated sampling period and store the global burn-in information and the local burn-in information in the first memory area 1011 and the second memory area 1012, respectively, predict whether a burn-in occurs at least partly in the whole area 1210 of the display area based on a result of analyzing the global burn-in information, predict whether the burn-in occurs at least partly in the boundary area 1110 of the display area based on a result of analyzing the local burn-in information, generate a first compensation map (e.g., first compensation map M1 of FIG. 14) including local compensation data calculated to correspond to the m block areas if it is predicted that the burn-in occurs at least partly in the boundary area 1110, generate a second compensation map (e.g., second compensation map M2 of FIG. 15) including global compensation data calculated to correspond to the n block areas if it is predicted that the burn-in occurs at least partly in a remaining area of the whole area 1210 excluding the boundary area 1110, and control the rollable display 230 to display compensated image data based on the first compensation map M1 or the second compensation map.

According to an embodiment, if it is predicted that the burn-in occurs at least partly in the boundary area 1110, the processor 120 may be configured to generate the first compensation map M1 by: calculating n pieces of global compensation data to correspond to the n block areas, respectively; calculating m pieces of local compensation data to correspond to the m block areas, respectively; and replacing some of the n pieces of global compensation data corresponding to the boundary area 1110 by the m pieces of local compensation data.

According to an embodiment, the processor 120 may be configured to: predict that the burn-in does not occur in the boundary area 1110 (e.g., see FIG. 11) and determine whether a first condition is satisfied, in which the burn-in occurs at least partly in the remaining area of the whole area 1210 excluding the boundary area 1110, compensate for the image data based on the second compensation map M2 if it is determined that the first condition is satisfied, and control the rollable display 230 to display the compensated image data based on the second compensation map M2.

According to an embodiment, the processor 120 may be configured to: predict that the burn-in occurs at least partly in the boundary area 1110 and determine whether a second condition is satisfied, in which the burn-in does not occur in the remaining area of the whole area 1210 excluding the boundary area 1110, compensate for the image data based on the first compensation map M1 if it is determined that the second condition is satisfied, and control the rollable display 230 to display the compensated image data based on the first compensation map M1.

According to an embodiment, the processor 120 may be configured to: predict that the burn-in occurs at least partly in the boundary area 1110 and determine whether a third condition is satisfied, in which the burn-in occurs at least partly in the remaining area of the whole area 1210 (e.g., see FIG. 11) excluding the boundary area 1110, calculate a first score representing the degree of burn-in predicted in the boundary area 1110 and a second score representing the degree of burn-in predicted in the remaining area of the whole area 1210 if it is determined that the third condition is satisfied, and control to display the compensated image data based on the first compensation map M1 or the second compensation map M2 based on a result of comparing the first score and the second score with each other.

According to an embodiment, the processor 120 may be configured to control the rollable display 230 to display the compensated image data based on the first compensation map M1 if the first score is larger than the second score.

According to an embodiment, the processor 120 may be configured to control the rollable display 230 to display the compensated image data based on the second compensation map M2 if the second score is larger than the first score.

According to an embodiment, the processor 120 may be configured to: calculate a first cumulative time while the first area 231 of the rollable display 230 displays a specific screen, calculate a second cumulative time while the second area 232 of the rollable display 230 displays a specific screen, determine a first sampling period based on the first cumulative time, determine a second sampling period based on the second cumulative time, obtain the global burn-in information and the local burn-in information corresponding to the first area 231 for each of the first sampling period, and obtain the global burn-in information and the local burn-in information corresponding to the second area 232 for each of the second sampling period.

According to an embodiment, the processor 120 may be configured to set the second sampling period to be smaller than or equal to the first sampling period.

According to an embodiment, the processor 120 may be configured to initialize the first cumulative time and the second cumulative time for each designated time period.

According to embodiments of the disclosure, a method for driving an electronic device 101, including a rollable/flexible display 230 provided with a display area whose area is adjusted in interworking with a movement of at least a part of a housing 240 in a first direction, the rollable display 230 including a first area 231 fixedly exposed to an outside and a second area 232 variably exposed to the outside in interworking with the movement of the housing 240; and a memory including a first memory area 1011 configured to store global burn-in information corresponding to n designated block areas divided from a whole area 1210 of the display area including the first area 231 and the second area 232 and a second memory area 1012 configured to store local burn-in information corresponding to m designated block areas divided from a boundary area 1110 located on a boundary between the first area 231 and the second area 232 of the rollable display 230 and having a designated width, the method may include: obtaining the global burn-in information and the local burn-in information for each designated sampling period and storing the global burn-in information and the local burn-in information in the first memory area 1011 and the second memory area 1012, respectively; predicting whether a burn-in occurs at least partly in the whole area 1210 of the display area based on a result of analyzing the global burn-in information; predicting whether the burn-in occurs at least partly in the boundary area 1110 of the display area based on a result of analyzing the local burn-in information; generating a first compensation map M1 including local compensation data calculated to correspond to the m block areas if it is predicted that the burn-in occurs at least partly in the boundary area 1110; generating a second compensation map M2 including global compensation data calculated to correspond to the n block areas if it is predicted that the burn-in occurs at least partly in a remaining area of the whole area 1210 excluding the boundary area 1110; and controlling the rollable display 230 to display compensated image data based on the first compensation map M1 or the second compensation map M2.

According to an embodiment, generating the first compensation map M1 may include: calculating n pieces of global compensation data to correspond to the n block areas, respectively; calculating m pieces of local compensation data to correspond to the m block areas, respectively; and replacing some of the n pieces of global compensation data corresponding to the boundary area 1110 by the m pieces of local compensation data.

According to an embodiment, the method may further include: predicting that the burn-in does not occur in the boundary area 1110 and determining whether a first condition is satisfied, in which the burn-in occurs at least partly in the remaining area of the whole area 1210 excluding the boundary area 1110; compensating for the image data based on the second compensation map M2 if it is determined that the first condition is satisfied; and controlling the rollable display 230 to display the compensated image data based on the second compensation map M2.

According to an embodiment, the method may further include: predicting that the burn-in occurs at least partly in the boundary area 1110 and determining whether a second condition is satisfied, in which the burn-in does not occur in the remaining area of the whole area 1210 excluding the boundary area 1110; compensating for the image data based on the first compensation map M1 if it is determined that the second condition is satisfied; and controlling the rollable display 230 to display the compensated image data based on the first compensation map M1.

According to an embodiment, the method may further include: predicting that the burn-in occurs at least partly in the boundary area 1110 and determining whether a third condition is satisfied, in which the burn-in occurs at least partly in the remaining area of the whole area 1210 excluding the boundary area 1110; calculating a first score representing the degree of burn-in predicted in the boundary area 1110 and a second score representing the degree of burn-in predicted in the remaining area of the whole area 1210 if it is determined that the third condition is satisfied; and controlling to display the compensated image data based on the first compensation map M1 or the second compensation map M2 based on a result of comparing the first score and the second score with each other.

According to an embodiment, the method may further include: controlling the rollable display 230 to display the compensated image data based on the first compensation map M1 if the first score is larger than the second score.

According to an embodiment, the method may further include: controlling the rollable display 230 to display the compensated image data based on the second compensation map M2 if the second score is larger than the first score.

According to an embodiment, the method may further include: calculating a first cumulative time while the first area 231 of the rollable display 230 displays a specific screen; calculating a second cumulative time while the second area 232 of the rollable display 230 displays a specific screen; determining a first sampling period based on the first cumulative time; determining a second sampling period based on the second cumulative time; obtaining the global burn-in information and the local burn-in information corresponding to the first area 231 for each of the first sampling period; and obtaining the global burn-in information and the local burn-in information corresponding to the second area 232 for each of the second sampling period.

According to an embodiment, the method may further include: setting the second sampling period to be smaller than or equal to the first sampling period.

According to an embodiment, the method may further include: initializing the first cumulative time and the second cumulative time for each designated time period.

Figure 10:
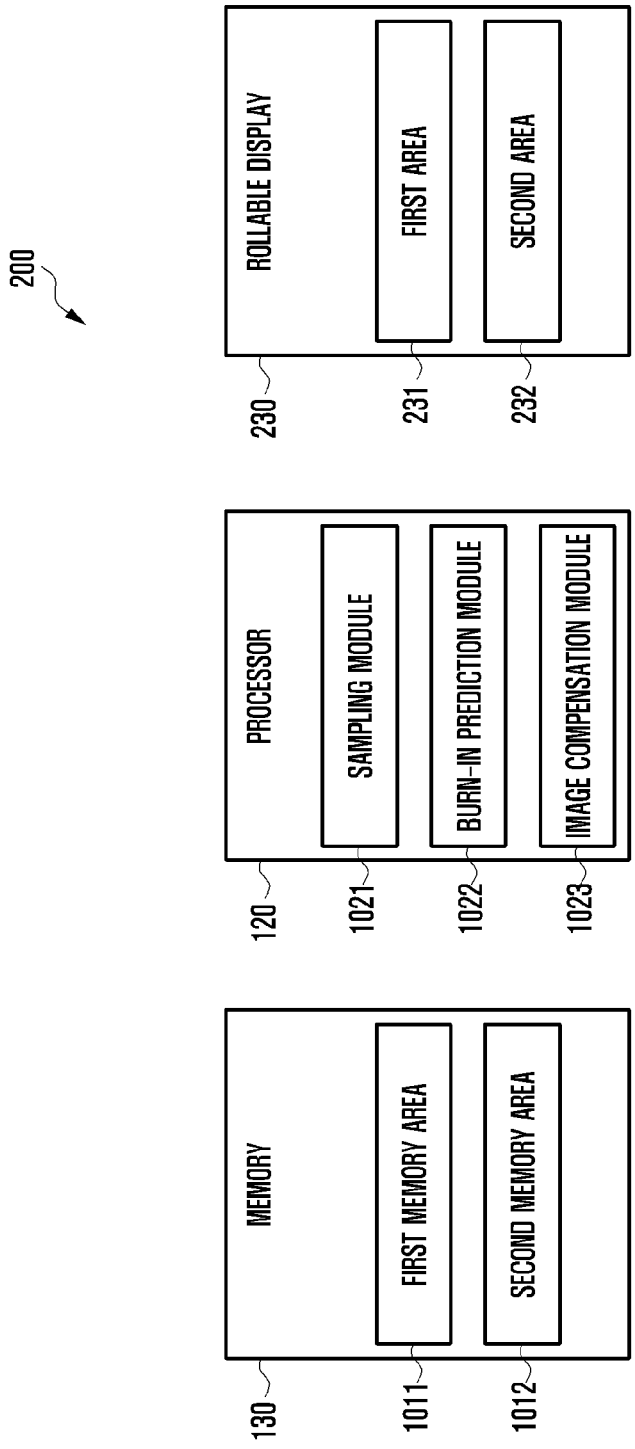
FIG. 10 is a block diagram of an electronic device according to embodiments of the disclosure.
Figure 11:
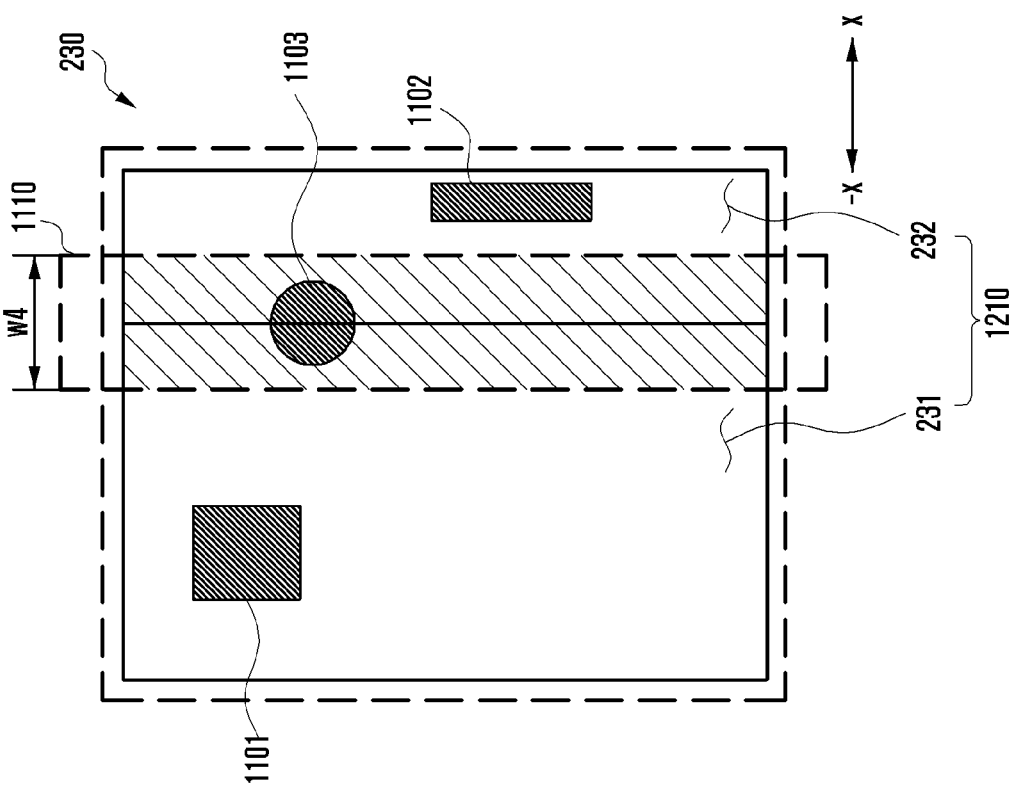
FIG. 11 is a schematic plan view of a rollable display according to an example embodiment.

FIG. 10 is a block diagram of an electronic device 200 according to embodiments. FIG. 11 is a schematic plan view of a rollable display 230 according to an embodiment.

The electronic device 200 illustrated in FIG. 10 may be similar to the electronic device 101 illustrated in FIG. 1 and the electronic device 200 illustrated in FIGS. 2A to 8B at least partly, or may include other embodiments. Hereinafter, in relation to FIG. 10, only features of the electronic device 200, which are not explained in FIGS. 1 to 8B or which are different from those explained in FIGS. 1 to 8B, will be described.

With reference to FIGS. 10 and 11, an electronic device 200 according to an embodiment may include a memory 130 (e.g., memory 130 of FIG. 1), a processor 120 (e.g., processor 120 of FIG. 1), and/or a rollable display 230 (e.g., display module 160 of FIG. 1).

According to an embodiment, as described above with reference to FIGS. 2 to 4, the rollable display 230 may include a first area 231 (e.g., first area of FIG.>4) and a second area 232 (e.g., second area of FIG. 4). According to an embodiment, the first area 231 of the rollable display 230 may be a part of the rollable display 230 fixedly exposed to outside regardless of movement of a housing (e.g., housing 240 of FIG. 2A). According to an embodiment, the second area 232 of the rollable display 230 may be another part of the rollable display 230 variably exposed to the outside in interworking with the movement of the housing 240. According to embodiments of the disclosure, the electronic device 200 may configure a boundary area (not illustrated) (e.g., boundary area 1110 of FIG. 11) located between the first area 231 and the second area 232 as a region of interest (ROI) and having a designated width W4. According to an embodiment, since the boundary area 1110 is located between the first area 231 and the second area 232, it may be an area having high possibility of burn-in phenomenon occurrence as compared with other areas.

According to an embodiment, the memory 130 may store therein burn-in information of the rollable display 230. According to an embodiment, the burn-in information of the rollable display 230 may include history information of aging factors of pixels included in the rollable display 230. According to an embodiment, the history information of the aging factors of the pixels may include a luminance, temperature, or usage time (e.g., light-emitting time).

According to an embodiment, the memory 130 may include a memory area having a size in which the whole display area (e.g., whole display area 1210 of FIG. 11) of the rollable display 230 or at least one region of interest (ROI) (e.g., boundary area 1110 of FIG. 11) is scaled as blocks of a designated unit. According to an embodiment, the memory 130 may include a first memory area 1011 storing global burn-in information having a size in which the whole display area 1210 of the rollable display 230 is scaled as n designated blocks, and a second memory area 1012 storing local burn-in information in which at least one region of interest (e.g., boundary area 1110 of FIG. 11) is scaled as m designated blocks. Since the electronic device 200 according to an embodiment separately includes the second memory area 1012 storing the local burn-in information corresponding to the at least one region of area in addition to the first memory area 1011 storing the global burn-in information corresponding to the whole display area 1210, it is easy to design the electronic device and precise burn-in compensation for the region of interest may be possible.

According to an embodiment, the processor 120 may include a sampling module 1021, a burn-in prediction module 1022, or an image compensation module 1023. According to an embodiment, at least some of the sampling module 1021, the burn-in prediction module 1022, or the image compensation module 1023 included in the processor 120 and functional operations thereof may be performed by the DDI (e.g., DDI 930 of FIG. 9).

According to an embodiment, the sampling module 1021 of the processor 120 may obtain the global burn-in information and the local burn-in information every designated sampling period, and may store the obtained information in the first memory area 1011 and the second memory area 1012, respectively. For example, the sampling module 1021 may store the global burn-in information in the first memory area 1011, and may store the local burn-in information in the second memory area 1012.

According to an embodiment, the sampling module 1021 of the processor 120 may sample aging factors including image data being displayed through the rollable display 230 every designated sampling period, for example, the luminance, temperature, or usage time (e.g., light-emitting time of OLED). For example, the electronic device 200 may sample aging factors including image data being displayed through the rollable display 230 every designated sampling period, for example, the luminance, temperature, or usage time (e.g., light-emitting time of OLED). According to an embodiment, the designated sampling period may be differently set for the first area 231 and the second area 232 of the rollable display 230. For example, the processor 120 may determine the first sampling period based on the cumulative time while the first area 231 of the rollable display 230 displays the specific screen, and may determine the second sampling period based on the cumulative time while the second area 232 of the rollable display 230 displays the specific screen.

According to an embodiment, the sampling module 1021 of the processor 120 may calculate the first cumulative time while the first area 231 displays the specific screen. According to an embodiment, the electronic device 200 may calculate a relative ratio of the time while the first area 231 of the whole display area 1210 including the first area 231 and the second area 232 of the rollable display 230 is used. For example, the sampling module 1021 may determine that the time while only the first area 231 displays the specific screen corresponds to about 70% of the total usage time of the rollable display 230. In this case, it may be considered that the time while only the second area 232 displays the specific screen corresponds to about 30% of the total usage time of the rollable display 230. In another embodiment, the electronic device 200 may initialize the first cumulative time every designated time period, and may calculate the first cumulative time while the first area 231 displays the specific screen from the initialized time point. In another embodiment, the electronic device 200 may adaptively vary (e.g., update) the first sampling period in accordance with the change of user's habits of using the electronic device 200 through initialization of the first cumulative time every designated time period.

According to an embodiment, the sampling module 1021 of the processor 120 may calculate the second cumulative time while the second area displays the specific screen. According to an embodiment, the electronic device 200 may calculate a relative ratio of the time while the second area 232 of the whole display area 1210 including the first area 231 and the second area 232 of the rollable display 230 is used. According to an embodiment, the electronic device 200 may calculate the ratio of the time while the second area 232 displays the specific screen to the total usage time from the time when the rollable display 230 was produced up to the present. In another embodiment, the electronic device 200 may adaptively vary (e.g., update) the second sampling period in accordance with the change of the user's habits of using the electronic device 200 through initialization of the second cumulative time every designated time period.

According to an embodiment, the sampling module 1021 of the processor 120 may determine the first sampling period based on the first cumulative time. According to an embodiment, the sampling module 1021 may determine the first sampling period in proportion to the amount of the first cumulative time. According to an embodiment, the electronic device 200 may set the first sampling period to be longer as the first cumulative time while the first area 231 displays the specific screen alone becomes longer. According to an embodiment, the first sampling period may be determined based on the relative ratio of the time while the first area 231 of the total display area 1210 including the first area 231 and the second area 232 of the rollable display 230 is used.

According to an embodiment, the sampling module 1021 of the processor 120 may determine the second sampling period based on the second cumulative time. According to an embodiment, the electronic device 200 may determine the second sampling period in proportion to the amount of the second cumulative time. According to an embodiment, the electronic device 200 may set the second sampling period to be longer as the second cumulative time while the second area 232 displays the specific screen alone becomes longer. According to an embodiment, the second sampling period may be determined based on the relative ratio of the time while the second area 232 of the total display area 1210 including the first area 231 and the second area 232 of the rollable display 230 is used.

According to an embodiment, the sampling period (e.g., sampling rate of 60 Hz) may be smaller than or equal to the first sampling period (e.g., sampling rate of 0.05 Hz). The electronic device 200 according to an embodiment includes a form factor structure in which an open/closed state transition (e.g., transition between the first state and the second state) is possible, and if the open/closed state transition of the electronic device 200 occurs within a time that is shorter than the second sampling period, the burn-in information for the second area 232 may not be obtained. For example, a specific user may transition the electronic device 200 from the first state to the second state in about 8 seconds or less, and then may transition the electronic device 200 again from the second state to the first state. If the second sampling period is set to about 10 seconds, in the above user scenario, the electronic device 200 may be unable to obtain the burn-in information for the second area 232. For example, although the second area 232 of the rollable display 230 displays a specific screen for about 8 seconds or less, the electronic device 200 may be unable to obtain the aging factor for the second area 232. If the second sampling period is set to about 5 seconds, in the above user scenario, the electronic device 200 may obtain the burn-in information for the second area 232. Accordingly, the second sampling period may be set to be smaller than or equal to the first sampling period, and may be adaptively set depending on the change of user's habits of using the electronic device 200 (e.g., usage pattern). For example, a first user may habitually use the second state of the electronic device 200 only for a short time, and in this case, the electronic device 200 may set the second sampling period to a relatively short time (e.g., about 5 seconds). For example, a second user may habitually use the second state of the electronic device 200 for a long time, and in this case, the electronic device 200 may set the second sampling period to a relatively long time (e.g., about 10 seconds).

According to an embodiment, the burn-in prediction module 1022 of the processor 120 may predict whether the burn-in occurs at least partly in the whole display area 1210 of the rollable display 230 based on the result of analyzing the global burn-in information. The burn-in prediction module 1022 according to an embodiment may predict whether the burn-in occurs at least partly in at least one region of interest of the rollable display 230 based on the result of analyzing the local burn-in information.

According to an embodiment, the burn-in prediction module 1022 of the processor 120 may predict whether the burn-in occurs in the whole display area 1210 or at least one region of interest by using various methods. According to an embodiment, the burn-in prediction module 1022 may convert luminance information of each block area into histogram information, and may evaluate whether the burn-in occurs in each block area by using statistical information such as an average or dispersion (e.g., maximum value calculation, minimum value calculation, average value calculation, mode value calculation, or median value calculation). In another embodiment, the burn-in prediction module 1022 may convert chrominance and color temperature information of each block area into histogram information, and may evaluate whether the burn-in occurs in each block area by using the statistical information such as the average or dispersion. In another embodiment, the burn-in prediction module 1022 may image information corresponding to each block area, and may evaluate whether the burn-in occurs by using an advanced image processing technique, such as an image edge detection method, an image segmentation technique, or an image feature detection technique. In another embodiment, the burn-in prediction module 1022 may configure the image information corresponding to each block area as an input value of a machine learning algorithm, and may perform learning so that the algorithm can evaluate whether the burn-in occurs.

According to an embodiment, if it is predicted that the burn-in occurs at least partly in the display area of the rollable display 230, the image compensation module 1023 of the processor 120 may generate a compensation map (e.g., first compensation map M1 of FIG. 14 or second compensation map M2 of FIG. 15) including compensation data for preventing or reducing the burn-in phenomenon. According to an embodiment, the image compensation module 1023 may compensate for (or convert) the image data to be displayed through the rollable display 230 based on the generated compensation map (e.g., first compensation map M1 or second compensation map M2), and may control the rollable display 230 to display the compensated image data.

According to an embodiment, if it is predicted that the burn-in occurs at least partly in the boundary area 1110, the image compensation module 1023 of the processor 120 may generate the first compensation map M1 including local compensation data calculated to correspond to m block areas. For example, as denoted by 1103 of FIG. 11, the image compensation module 1023 may predict that the burn-in occurs in at least a part of the boundary area 1110, and may obtain the first compensation map M1 based on the result of the prediction. According to an embodiment, the image compensation module 1023 may compensate for (e.g., convert) the image data to be displayed through the rollable display 230 based on the first compensation map M1, and may control the rollable display 230 to display the compensated image data.

According to an embodiment, if it is predicted that the burn-in occurs at least partly in the remaining area excluding the boundary area 1110, the image compensation module 1023 of the processor 120 may generate the second compensation map M2 including the local compensation data calculated to correspond to the n block areas. For example, as denoted by 1101 and 1102 of FIG. 11, the image compensation module 1023 may predict that the burn-in occurs in at least a part of the remaining area excluding the boundary area 1110, and may obtain the second compensation map M2 based on the result of the prediction. According to an embodiment, the image compensation module 1023 may compensate for (e.g., convert) the image data to be displayed through the rollable display 230 based on the second compensation map M2, and may control the rollable display 230 to display the compensated image data.

According to an embodiment, the image compensation module 1023 of the processor 120 may predict that the burn-in occurs in both the boundary area 1110 and the remaining area excluding the boundary area 1110. For example, as denoted by 1101, 1102, and 1103, the image compensation module 1023 may predict that the burn-in occurs in both the boundary area 1110 and the remaining area excluding the boundary area 1110, and may determine the area having the greatest degree of burn-in among the corresponding areas (e.g., 1101, 1102, and 1103 of FIG. 11). According to an embodiment, the image compensation module 1023 may select the first compensation map M1 or the second compensation map M2 based on the area having the greatest degree of burn-in among the corresponding areas (e.g., 1101, 1102, and 1103 of FIG. 11), compensate for (e.g., convert) the image data to be displayed through the rollable display 230 based on the selected compensation map, and control the rollable display 230 to display the compensated image data. For example, if the area having the greatest degree of burn-in among the areas (e.g., 1101, 1102, and 1103 of FIG. 11) is a part 1103 of the boundary area 1110, the image compensation module 1023 of the processor 120 may control the rollable display 230 to display the compensated image data based on the first compensation map M1. For example, if the area having the greatest degree of burn-in among the areas (e.g., 1101, 1102, and 1103 of FIG. 11) is a part 1101 or 1102 of the remaining area excluding the boundary area 1110, the image compensation module 1023 of the processor 120 may control the rollable display 230 to display the compensated image data based on the second compensation map M2.

According to an embodiment, if it is predicted that the burn-in occurs in both the boundary area 1110 and the remaining area excluding the boundary area 1110, the image compensation module 1023 of the processor 120 may calculate a score that represents the degree of burn-in for each area, and may determine the area having the greatest degree of burn-in based on the calculated score. According to an embodiment, the image compensation module 1023 of the processor 120 may calculate the first score representing the degree of burn-in predicted in the boundary area, and the second score representing the degree of burn-in predicted in the remaining area of the whole area. According to an embodiment, the image compensation module 1023 of the processor 120 may control the rollable display 230 to display the compensated image data based on the first compensation map or the second compensation map based on the result of comparing the first score and the second score with each other. For example, if the first score is larger than the second score, the processor 120 may control the rollable display 230 to display the compensation image data based on the first compensation map. For example, if the second score is larger than the first score, the processor 120 may control the rollable display 230 to display the compensation image data based on the second compensation map.

Figure 12:
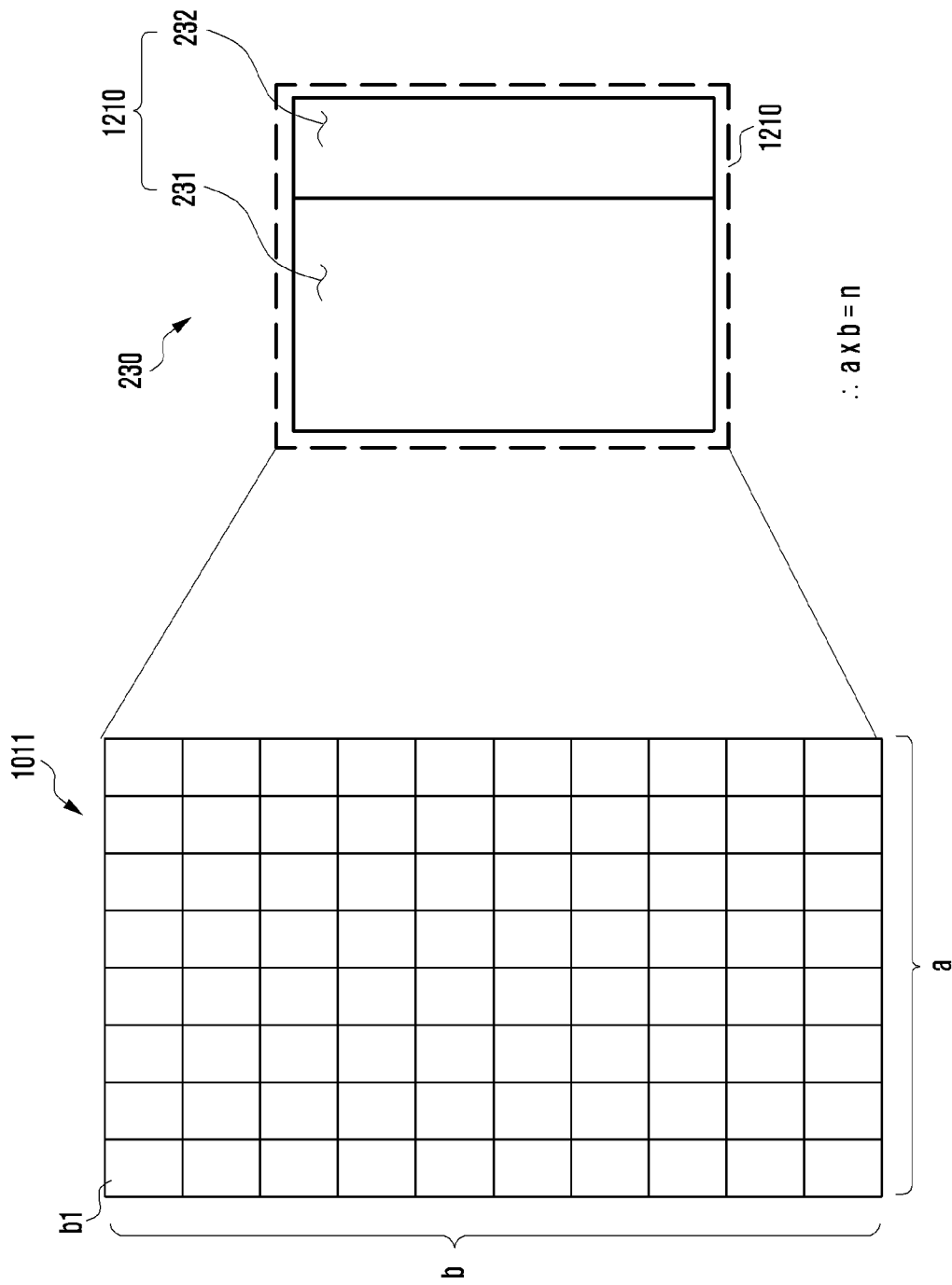
FIG. 12 is an example diagram explaining a first memory area according to an example embodiment.

FIG. 12 is an example diagram explaining a first memory area 1011 according to an embodiment.

With reference to FIG. 12, the first memory area 1011 (e.g., first memory area 1011 of FIG. 10) of the memory 130 (e.g., memory 130 of FIG. 1) according to an embodiment may store therein the global burn-in information corresponding to the whole display area 1210 of the rollable display 230 (e.g., display module 160 of FIG. 1). According to an embodiment, the electronic device 200 (e.g., electronic device 200 of FIG. 1) may divide the whole display area 1210 of the display area including the first area 231 (e.g., first area 231 of FIG. 4) and the second area 232 (e.g., second area 232 of FIG. 4) of the rollable display 230 into n designated block areas, and may store the global burn-in information corresponding to the n block areas in the first memory area 1011.

According to an embodiment, the global burn-in information may include history information of aging factors corresponding to the n block areas, respectively. According to an embodiment, the electronic device 200 may store history information of the luminance, temperature, or usage time (e.g., light-emitting time of OLED) in the first memory area 1011 as the history information of the aging factors corresponding to the n block areas, respectively.

According to an embodiment, the n block areas may be block areas in which the whole display area 1210 is divided into a columns and b rows. According to an embodiment, the electronic device 200 may configure n block areas by scaling the resolution of the whole display area 1210 as the resolution of a*b, and may store the history information of the aging factors corresponding to the n block areas, respectively.

According to an embodiment, in case that the electronic device 200 scales the resolution of the whole display area 1210 as the resolution of a*b, one block area may be a first block area b1 for example. For example, the resolution of the rollable display 230 may be a high definition (HD) of 1280*720, a full high definition (FHD) of 1920*1080, a quad high definition (QHD) of 2560*1440, or an ultrahigh definition (UHD) of 3840*2160, and the electronic device 200 may configure n first block areas b1 by scaling the resolution.

According to an embodiment, the electronic device 200 may store representative values representing the history information of the aging factors of the n first block areas b1, respectively. For example, the electronic device 200 may obtain the history information of the plurality of aging factors being mapped onto a plurality of pixels (or at least one pixel) disposed in a single first block area b1, calculate a single representative value by using a statistical calculation method (e.g., maximum value calculation, minimum value calculation, average value calculation, mode value calculation, or median value calculation) such as the average value calculation for the history information of the plurality of aging factors, and store the calculated representative value as a representative value representing the corresponding first block area b1. According to an embodiment, the electronic device 200 may store n representative values representing the n first block areas b1, respectively, as the global burn-in information.

Figure 13:
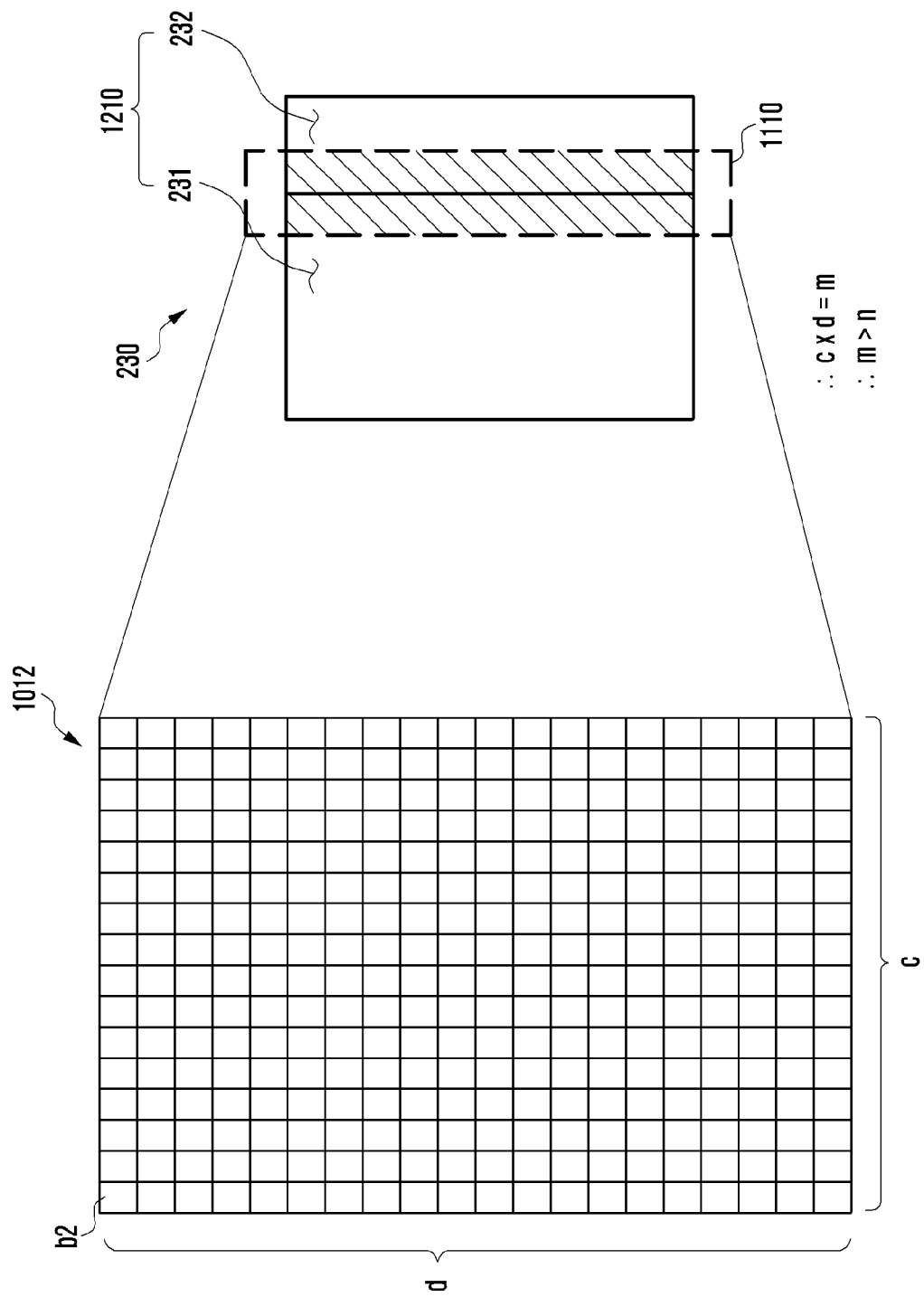
FIG. 13 is an example diagram explaining a second memory area according to an example embodiment.

FIG. 13 is an example diagram explaining a second memory area 1012 according to an embodiment.

With reference to FIG. 13, the second memory area 1012 (e.g., second memory area 1012 of FIG. 10) of the memory 130 (e.g., memory 130 of FIG. 1) according to an embodiment may store therein the local burn-in information corresponding to at least one designated region of interest of the rollable display 230 (e.g., display module 160 of FIG. 1). According to an embodiment, the electronic device (e.g., electronic device 200 of FIG. 1) may configure the boundary area 1110 (e.g., boundary area 1110 of FIG. 11) located on the boundary between the first area 231 (e.g., first area 231 of FIG. 4) and the second area 232 (e.g., second area 232 of FIG. 4) and having a designated width (e.g., W4 in FIG. 11) as the region of interest. For example, the electronic device 200 may store the local burn-in information corresponding to the boundary area 1110.

According to an embodiment, the electronic device 200 may divide the boundary area 1110 into m block areas, and may store the local burn-in information corresponding to the m block areas in the second memory area 1012.

According to an embodiment, the local burn-in information may include history information of aging factors corresponding to the m block areas, respectively.

According to an embodiment, the electronic device 200 may store history information of the luminance, temperature, or usage time (e.g., light-emitting time of OLED) in the second memory area 1012 as the history information of the aging factors corresponding to the m block areas, respectively.

According to an embodiment, the m block areas may be block areas in which the boundary area 1110 is divided into c columns and d rows. According to an embodiment, the electronic device 200 may configure m block areas by scaling the resolution of the boundary area 1110 as the resolution of c*d, and may store the history information of the aging factors corresponding to the m block areas, respectively. In a certain embodiment, the second memory area 1012 may store therein the history information of the aging factors corresponding to all pixels disposed in the boundary area 1110 without scaling the resolution of the boundary area 1110. According to an embodiment, the resolution (e.g., resolution of c*d) of the boundary area 1110 configured as the m block areas may be greater than the resolution (e.g., resolution of a*b) of the whole display area 1210 configured as the n block areas.

According to an embodiment, in case that the electronic device 200 scales the resolution of the boundary area 1110 as the resolution of c*d, one block area may be a second block area b2 for example. For example, the resolution of the rollable display 230 may be a high definition (HD) of 1280*720, a full high definition (FHD) of 1920*1080, a quad high definition (QHD) of 2560*1440, or an ultrahigh definition (UHD) of 3840*2160, and the electronic device 200 may configure m first block areas b2 by scaling the resolution of the boundary area 1110.

According to an embodiment, the electronic device 200 may store representative values representing the history information of the aging factors of the m second block areas b2, respectively. For example, the electronic device 200 may obtain the history information of the plurality of aging factors being mapped onto a plurality of pixels (or at least one pixel) disposed in a single second block area b2, calculate a single representative value by using a statistical calculation method (e.g., maximum value calculation, minimum value calculation, average value calculation, mode value calculation, or median value calculation) such as the average value calculation for the history information of the plurality of aging factors, and store the calculated representative value as a representative value representing the corresponding second block area b2. According to an embodiment, the electronic device 200 may store m representative values representing the m second block areas b2, respectively, as the local burn-in information.

Figure 14:
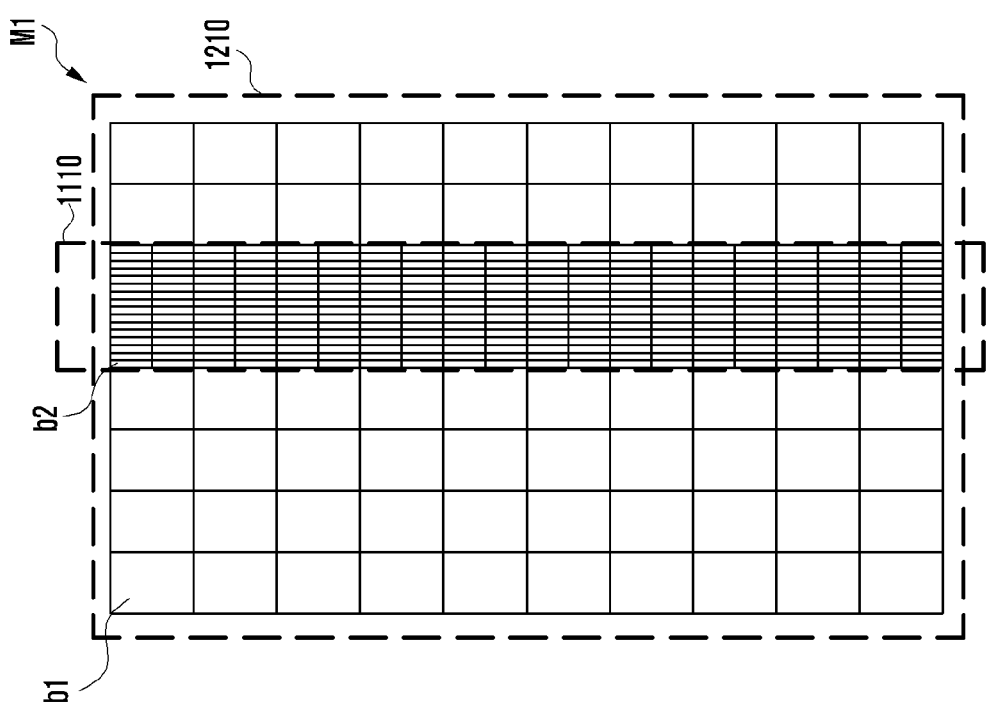
FIG. 14 is an example diagram explaining a first compensation map according to an example embodiment.

FIG. 14 is an example diagram explaining a first compensation map M1 according to an embodiment.

With reference to FIG. 14, the first compensation map M1 according to an embodiment may be a data group which includes the burn-in compensation data for the whole display area 1210 of the rollable display 230 (e.g., display module 160 of FIG. 1), but in which the burn-in compensation data for the boundary area 1110 (e.g., boundary area 1110 of FIG. 11) is relatively precisely calculated. According to an embodiment, the electronic device 200 (e.g., electronic device 200 of FIG. 1) may calculate the burn-in compensation data for the boundary area 1110 relatively precisely in consideration of the point that the boundary area 1110 is an area having a relatively high probability of the burn-in phenomenon occurrence as compared with other areas of the whole display area 1210.

According to an embodiment, the electronic device 200 may configure a plurality of second block areas b2 by dividing the boundary area 1110 with the resolution of c*d, and may determine the local compensation data being mapped for the respective second block areas b2. According to an embodiment, the electronic device 200 may configure a plurality of first block areas b1 by dividing the remaining areas excluding the boundary area 1110 with the resolution of a*b, and may determine the global compensation data being mapped for the respective first block areas b1. According to an embodiment, the electronic device 200 may generate the first compensation map M1 by combining the local compensation data calculated to correspond to the boundary area 1110 and the global compensation data calculated to correspond to the remaining areas excluding the boundary area 1110 with each other.

According to an embodiment, the electronic device 200 may perform the following operations in generating the first compensation map M1.

According to an embodiment, the electronic device 200 may divide the whole display area 1210 of the rollable display 230 into n first block areas b1, and may calculate the global compensation data being mapped for the respective first block areas b1. For example, the global compensation data may be n global compensation data calculated to correspond to the n first block areas b1 through dividing of the whole display area 1210 with the resolution of a*b.

According to an embodiment, the electronic device 200 may divide the boundary area 1110 of the rollable display 230 into m second block areas b2, and may calculate the local compensation data being mapped for the respective second block areas b2. For example, the local compensation data may be m local compensation data calculated to correspond to the m second block areas b2 through dividing of the boundary area 1110 of the rollable display 230 with the resolution of c*d.

According to an embodiment, the electronic device 200 may replace some global compensation data corresponding to the boundary area 1110 among the n global compensation data by the m local compensation data. Accordingly, the compensation data corresponding to the boundary area 1110 of the first compensation map M1 may be calculated with the precise resolution as compared with the compensation data corresponding to other areas excluding the boundary area 1110. Since the electronic device 200 according to an embodiment calculates the compensation data corresponding to the boundary area 1110 with the precise resolution as compared with other areas, the burn-in phenomenon for the boundary area 1110 can be prevented or reduced from being visually perceived by the user's naked eye.

According to an embodiment, the electronic device may compensate for the image data based on the first compensation map M1 when the following conditions are satisfied. According to an embodiment, if it is predicted that the burn-in occurs only in the boundary area 1110 of the rollable display 230 or the degree of burn-in in the boundary area 1110 of the rollable display 230 is relatively great, the electronic device 200 may compensate for the image data based on the first compensation map M1. For example, the electronic device 200 may determine the area in which the burn-in occurrence is predicted in the whole display area 1210 of the rollable display 230 with reference to the first memory area 1011 and the second memory area 1012. If it is predicted that the burn-in occurs only in the boundary area 1110 of the rollable display 230 and it is not predicted that the burn-in occurs in the remaining area excluding the boundary area 1110, the electronic device 200 may compensate for the image data based on the first compensation map M1. If it is predicted that the burn-in occurs in both the boundary area 1110 of the rollable display 230 and the remaining area excluding the boundary area 1110, the electronic device 200 may compare the degrees of burn-in for the respective areas. If it is predicted that the degree of burn-in is relatively great in the boundary area 1110 of the rollable display 230, the electronic device 200 may compensate for the image data based on the first compensation map M1.

Figure 15:
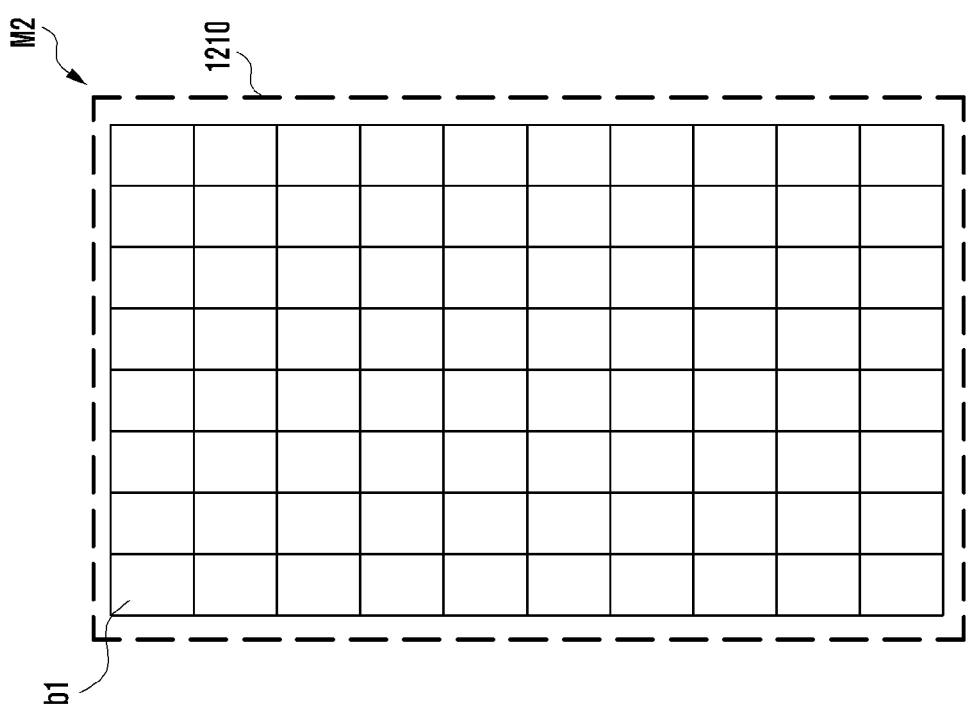
FIG. 15 is an example diagram explaining a second compensation map according to an example embodiment.

FIG. 15 is an example diagram explaining a second compensation map M2 according to an embodiment.

With reference to FIG. 15, the second compensation map M2 according to an embodiment may be a data group in which the burn-in compensation data for the whole display area 1210 of the rollable display 230 (e.g., display module 160 of FIG. 1) is calculated with uniform resolution.

According to an embodiment, the electronic device 200 (e.g., electronic device 200 of FIG. 1) may configure a plurality of first block areas b1 by dividing the whole display area 1210 with the resolution of a*b, and may determine the global compensation data being mapped for the respective first block areas b1. According to an embodiment, the electronic device 200 may generate the second compensation map M2 based on the calculated global compensation data.

According to an embodiment, the electronic device 200 may compensate for the image data based on the second compensation map M2 when the following conditions are satisfied. According to an embodiment, if it is predicted that the burn-in occurs only in the remaining area excluding the boundary area 1110 of the rollable display 230 or the degree of burn-in in the remaining area is relatively great, the electronic device 200 may compensate for the image data based on the second compensation map M2. For example, the electronic device 200 may determine the area in which the burn-in occurrence is predicted in the display area of the rollable display 230 with reference to the first memory area 1011 and the second memory area 1012. If it is predicted that the burn-in occurs only in the remaining area excluding the boundary area 1110 of the rollable display 230 and it is not predicted that the burn-in occurs in the boundary area 1110, the electronic device 200 may compensate for the image data based on the second compensation map M2. If it is predicted that the burn-in occurs in both the boundary area 1110 of the rollable display 230 and the remaining area excluding the boundary area 1110, the electronic device 200 may compare the degrees of burn-in for the respective areas. If it is predicted that the degree of burn-in is relatively great in the remaining area, the electronic device 200 may compensate for the image data based on the second compensation map M2.

Figure 16:
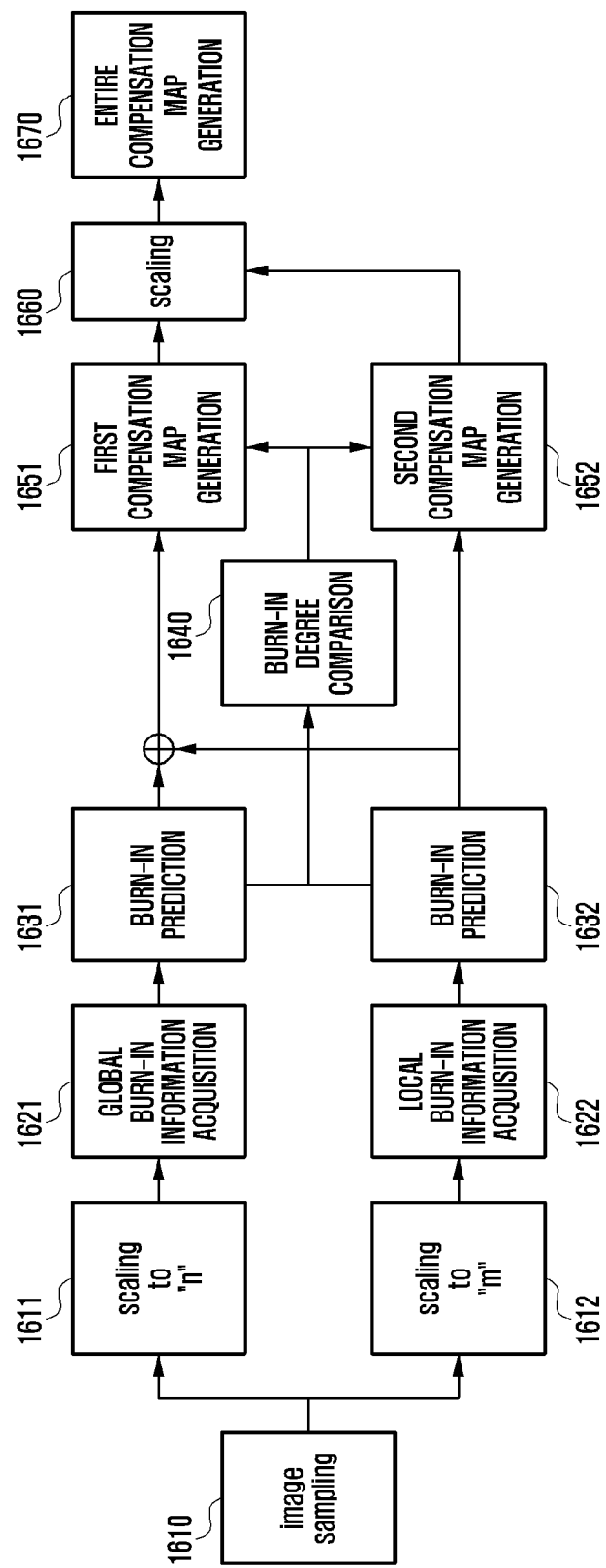
FIG. 16 is an operation flowchart of an electronic device according to an example embodiment.

FIG. 16 is an operation flowchart of an electronic device 200 according to an embodiment.

At least some of operations illustrated in FIG. 16 may be omitted. Before or after the at least some operations illustrated in FIG. 16, at least some operations mentioned with reference to other drawings may be additionally inserted in the document.

The operations illustrated in FIG. 16 may be performed by the electronic device 200 (e.g., electronic device 101 of FIG. 1) or the processor 120 (e.g., processor 120 of FIG. 1) or may be performed by the DDI (e.g., DDI 930 of FIG. 9) of the electronic device 200. In an embodiment, the memory 130 (e.g., memory 130 of FIG. 1) of the electronic device 200, when executed, may store therein instructions for causing the processor 120 to perform at least some operations illustrated in FIG. 16.

In step 1610, the electronic device 200 (e.g., electronic device 101 of FIG. 1 or the sampling module 1021 of the processor 120) according to an embodiment may sample aging factors including image data being displayed through the rollable display 230 every designated sampling period, for example, the luminance, temperature, or usage time (e.g., light-emitting time of OLED). For example, the electronic device 200 may sample the aging factors including the image data being displayed through the rollable display 230 every designated sampling period, for example, the luminance, temperature, or usage time (e.g., light-emitting time of OLED). According to an embodiment, the designated sampling period may be differently set for the first area 231 (e.g., first area 231 of FIG. 4) and the second area 232 (e.g., second area 232 of FIG. 4) of the rollable display 230. For example, the processor 120 may determine the first sampling period based on the cumulative time while the first area 231 of the rollable display 230 displays the specific screen, and may determine the second sampling period based on the cumulative time while the second area 232 of the rollable display 230 displays the specific screen. In an embodiment, features for the electronic device 200 to set the sampling period will be described in detail with reference to FIG. 20.

In steps 1611 and 1621, the electronic device 200 (e.g., sampling module 1021 of the processor 120) according to an embodiment may configure n first block areas b1 by scaling the resolution of the whole display area 1210 of the rollable display 230 as the resolution of a*b, and may store history information of aging factors corresponding to the respective n first block areas b1 as the global burn-in information. According to an embodiment, the electronic device 200 may store history information of the luminance, temperature, or usage time (e.g., light-emitting time of OLED) in the first memory area 1011 (e.g., first memory area 1011 of FIG. 10) as the history information of the aging factors corresponding to the respective n first block areas b1.

In steps 1612 and 1622, the electronic device 200 (e.g., including sampling module 1021 of the processor 120) according to an embodiment may configure m second block areas b2 by scaling the resolution of the boundary area 1110 (e.g., boundary area 1110 of FIG. 11) as the resolution of c*d, and may store history information of aging factors corresponding to the respective m second block areas b2 as the local burn-in information. According to an embodiment, the electronic device 200 may store history information of the luminance, temperature, or usage time (e.g., light-emitting time of OLED) in the second memory area 1012 (e.g., second memory area 1012 of FIG. 10) as the history information of the aging factors corresponding to the respective m second block areas b2. In a certain embodiment, the second memory area 1012 may store therein history information of aging factors corresponding to all pixels disposed in the boundary area 1110 without scaling the resolution of the boundary area 1110.

In step 1631, the electronic device 200 (e.g., including burn-in prediction module 1022 of the processor 120) according to an embodiment may predict whether the burn-in occurs at least partly in the whole display area 1210 of the rollable display 230 based on the result of analyzing the global burn-in information. For example, the electronic device 200 may predict whether the burn-in occurs at least partly in the whole display area 1210 of the rollable display 230 in the unit of first block area b1 divided with the first resolution (e.g., resolution of a*b of FIG. 12).

In step 1632, the electronic device 200 (e.g., including burn-in prediction module 1022 of the processor 120) according to an embodiment may predict whether the burn-in occurs at least partly in the region of interest (e.g., boundary area 1110 located between the first area 231 and the second area 232 and having a designated width) of the rollable display 230 based on the result of analyzing the local burn-in information. For example, the electronic device 200 may predict whether the burn-in occurs at least partly in the boundary area 1110 of the rollable display 230 in the unit of second block area b2 divided with the second resolution (e.g., resolution of c*d of FIG. 13). The electronic device 200 according to an embodiment may not perform steps 1640 and 1652 to be described later based on the determination that the burn-in does not occur in the boundary area 1110.

In step 1640, if it is predicted that the burn-in occurs in at least some areas of the rollable display 230, the electronic device 200 (e.g., including burn-in prediction module 1022 of the processor 120) according to an embodiment may compare the degrees of burn-in for the predicted areas. According to an embodiment, the electronic device 200 may predict the burn-in occurrence only in the boundary area 1110 of the rollable display 230, only in the remaining area excluding the boundary area 1110 of the rollable display 230, or in both the boundary area 1110 of the rollable display 230 and the remaining area excluding the boundary area 1110. According to an embodiment, if the burn-in occurrence is predicted in both the boundary area 1110 of the rollable display 230 and the remaining area excluding the boundary area 1110, the electronic device 200 may determine which area is the area having the greatest degree of burn-in. For example, the electronic device 200 may determine that the burn-in having the greatest degree of burn-in occurs in the boundary area 1110, or may determine that the burn-in having the greatest degree of burn-in occurs in the remaining area excluding the boundary area 1110.

In step 1651, if it is predicted that the burn-in occurs only in the boundary area 1110 of the rollable display 230, or if it is predicted that the degree of burn-in is relatively great in the boundary area 1110 of the rollable display 230, the electronic device 200 (e.g., including image compensation module 1023 of the processor 120) may generate the first compensation map M1. The first compensation map M1 according to an embodiment may be a data group which includes the burn-in compensation data for the whole display area 1210 of the rollable display 230, but in which the burn-in compensation data for the boundary area 1110 is relatively precisely calculated.

In step 1652, if it is predicted that the burn-in occurs only in the remaining area excluding the boundary area 1110 of the rollable display 230, or if it is predicted that the degree of burn-in is relatively great in the remaining area, the electronic device 200 (e.g., including image compensation module 1023 of the processor 120) according to an embodiment may generate the second compensation map M2. The second compensation map M2 according to an embodiment may be a data group in which the burn-in compensation data for the whole display area 1210 of the rollable display 230 is calculated with uniform resolution.

In steps 1660 and 1670, the electronic device 200 (e.g., including image compensation module 1023 of the processor 120) according to an embodiment may generate the entire compensation maps corresponding to all pixels of the whole display area 1210 by scaling the burn-in compensation data for the respective block areas (e.g., first block area b1 and/or the second block area b2) determined in accordance with the first compensation map M1 or the second compensation map M2 with the designated resolution of the rollable display 230. According to an embodiment, since the electronic device 200 compensates for the image data based on the entire compensation maps, and makes the rollable display 230 display the compensated image data, the burn-in phenomenon of the rollable display 230 can be prevented or reduced from being visually perceived by the user's naked eye.

Figure 17:
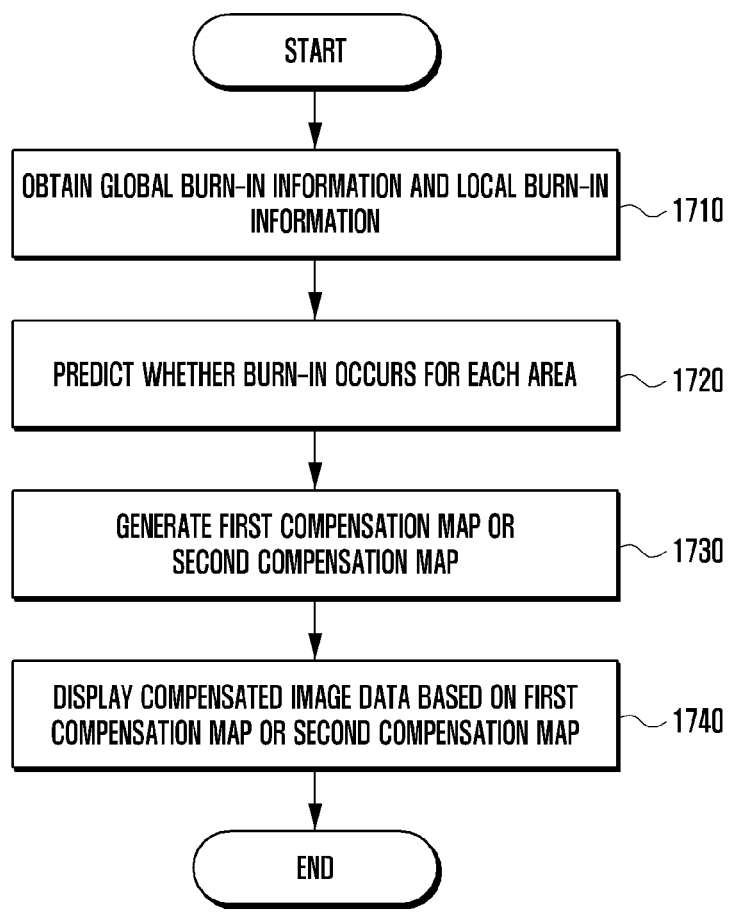
FIG. 17 is an operation flowchart of an electronic device according to an example embodiment.

FIG. 17 is an operation flowchart of an electronic device 200 according to an embodiment.

At least some of operations illustrated in FIG. 17 may be omitted. Before or after the at least some operations illustrated in FIG. 17, at least some operations mentioned with reference to other drawings may be additionally inserted in the document.

The operations illustrated in FIG. 17 may be performed by the electronic device 200 (e.g., electronic device 101 of FIG. 1) or the processor 120 (e.g., processor 120 of FIG. 1) or may be performed by the DDI (e.g., DDI 930 of FIG. 9) of the electronic device 200. In an embodiment, the memory 130 (e.g., memory 130 of FIG. 1) of the electronic device 200, when executed, may store therein instructions for causing the processor 120 to perform at least some operations illustrated in FIG. 17.

The operation flowchart of the electronic device 200 illustrated in FIG. 17 may at least partly similar to the flowchart illustrated in FIG. 16, or may include other embodiments. Hereinafter, different or unexplained operations of the electronic device 200 will be described with reference to FIG. 17.

In step 1710, the electronic device 200 (e.g., electronic device 101 of FIGS. 1 and/or 200 of FIG. 2) (e.g., sampling module 1021 of the processor 120) according to an embodiment may sample aging factors including image data being displayed through the rollable display 230 every designated sampling period, for example, the luminance, temperature, or usage time (e.g., light-emitting time of OLED). For example, the electronic device 200 may sample the aging factors including the image data being displayed through the rollable display 230 every designated sampling period, for example, the luminance, temperature, or usage time (e.g., light-emitting time of OLED). The electronic device 200 according to an embodiment may configure n block areas by scaling the resolution of the whole display area 1210 of the rollable display 230 as the resolution of a*b, and may store history information of aging factors corresponding to the respective n block areas as the global burn-in information. The electronic device 200 according to an embodiment may configure m block areas by scaling the resolution of the boundary area 1110 (e.g., boundary area 1110 of FIG. 11) as the resolution of c*d, and may store history information of aging factors corresponding to the respective m block areas as the local burn-in information.

In step 1720, the electronic device 200 (e.g., including burn-in prediction module 1022 of the processor 120) according to an embodiment may predict whether the burn-in occurs at least partly in the whole display area 1210 of the rollable display 230 based on the result of analyzing the global burn-in information. The electronic device 200 according to an embodiment may predict whether the burn-in occurs at least partly in the region of interest (e.g., boundary area 1110 located between the first area 231 and the second area 232 and having a designated width) of the rollable display 230 based on the result of analyzing the local burn-in information.

In step 1730, the electronic device 200 according to an embodiment may compare the degrees of burn-in for areas, and may generate the first compensation map M1 or the second compensation map M2 based on the result of comparing the degrees of burn-in. if it is predicted that the burn-in occurs only in the boundary area 1110 of the rollable display 230, or if it is predicted that the degree of burn-in is relatively great in the boundary area 1110 of the rollable display 230, the electronic device 200 according to an embodiment may generate the first compensation map M1. If it is predicted that the burn-in occurs only in the remaining area excluding the boundary area 1110 of the rollable display 230, or if it is predicted that the degree of burn-in is relatively great in the remaining area, the electronic device 200 according to an embodiment may generate the second compensation map M2.

In steps 1740, the electronic device 200 (e.g., including image compensation module 1023 of the processor 120) according to an embodiment may generate the entire compensation maps corresponding to all pixels of the whole display area 1210 by scaling the burn-in compensation data for the respective block areas determined in accordance with the first compensation map M1 or the second compensation map M2 with the designated resolution of the rollable display 230. According to an embodiment, since the electronic device 200 compensates for the image data based on the entire compensation maps, and makes the rollable display 230 display the compensated image data, the burn-in phenomenon of the rollable display 230 can be prevented or reduced from being visually perceived by the user's naked eye.

Figure 18:
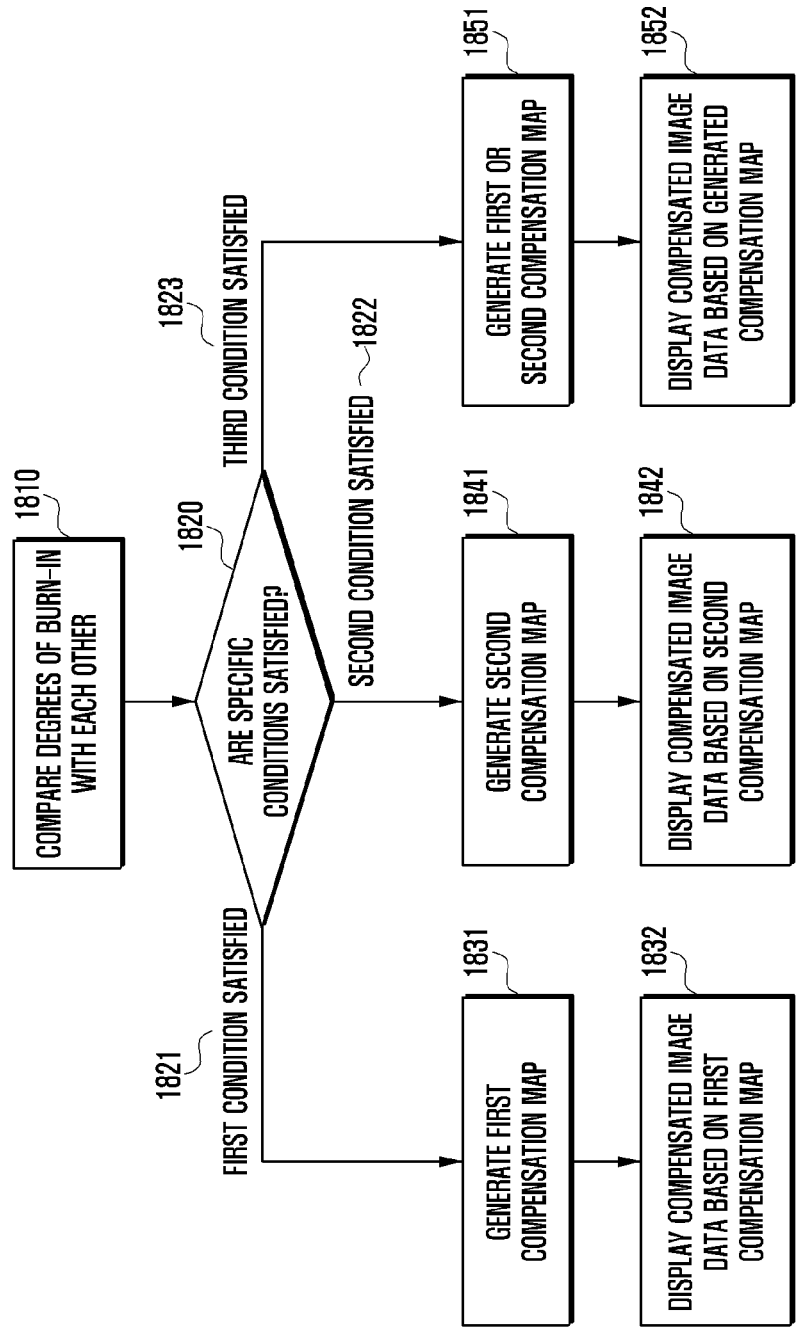
FIG. 18 is a flowchart illustrating an operation in which an electronic device determines a compensation map in accordance with the degree of burn-in according to an example embodiment.

FIG. 18 is a flowchart illustrating an operation in which an electronic device 200 determines a compensation map in accordance with the degree of burn-in according to an embodiment.

At least some of operations illustrated in FIG. 18 may be omitted. Before or after the at least some operations illustrated in FIG. 18, at least some operations mentioned with reference to other drawings may be additionally inserted in the document.

The operations illustrated in FIG. 18 may be performed by the electronic device 200 (e.g., electronic device 101 of FIG. 1) or the processor 120 (e.g., processor 120 of FIG. 1) or may be performed by the DDI (e.g., DDI 930 of FIG. 9) of the electronic device 200. In an embodiment, the memory 130 (e.g., memory 130 of FIG. 1) of the electronic device 200, when executed, may store therein instructions for causing the processor 120 to perform at least some operations illustrated in FIG. 18.

The operation flowchart of the electronic device 200 illustrated in FIG. 18 may at least partly similar to the flowchart illustrated in FIG. 16, or may include other embodiments. Hereinafter, different or unexplained operations of the electronic device 200 will be described with reference to FIG. 18.

In step 1810, if it is predicted that the burn-in occurs in at least some areas of the rollable display 230, the electronic device 200 (e.g., electronic device 200 of FIG. 1) (e.g., burn-in prediction module 1022 of the processor 120) according to an embodiment may compare the degrees of burn-in for the predicted areas. According to an embodiment, the electronic device 200 may predict the burn-in occurrence only in the boundary area 1110 (e.g., boundary area 1110 of FIG. 11) of the rollable display 230, only in the remaining area excluding the boundary area 1110 of the rollable display 230, or in both the boundary area 1110 of the rollable display 230 and the remaining area excluding the boundary area 1110.

In step 1820, if it is predicted that the burn-in occurs in at least some areas of the rollable display 230, the electronic device 200 according to an embodiment may determine whether a specific condition is satisfied. According to an embodiment, the specific condition may include a first condition, a second condition, or a third condition.

According to an embodiment, if it is predicted that the burn-in occurs at least partly in the boundary area 1110, and the burn-in does not occur in the remaining area excluding the boundary area 1110, the electronic device 200 may determine that the first condition is satisfied. According to an embodiment, if it is determined that the first condition is satisfied (e.g., if the result of step 1820 corresponds to step 1821), the electronic device 200 may perform step 1831.

According to an embodiment, if it is predicted that the burn-in does not occur in the boundary area 1110, and the burn-in occurs at least partly in the remaining area excluding the boundary area 1110, the electronic device 200 may determine that the second condition is satisfied. According to an embodiment, if it is determined that the second condition is satisfied (e.g., if the result of step 1820 corresponds to step 1822), the electronic device 200 may perform step 1841.

According to an embodiment, if it is predicted that the burn-in occurs at least partly in the boundary area 1110, and the burn-in occurs at least partly in the remaining area excluding the boundary area 1110, the electronic device 200 may determine that the third condition is satisfied. According to an embodiment, if it is determined that the third condition is satisfied (e.g., if the result of step 1820 corresponds to step 1823), the electronic device 200 may perform step 1851.

In steps 1831 and 1832, the electronic device 200 according to an embodiment may generate the first compensation map M1 based on the determination that the first condition is satisfied (e.g., the result of step 1820 corresponds to step 1821), and may control the rollable display 230 to display the compensated image data based on the first compensation map M1. The first compensation map M1 according to an embodiment may be a data group which includes the burn-in compensation data for the whole display area 1210 of the rollable display 230, but in which the burn-in compensation data for the boundary area 1110 is relatively precisely calculated.

In steps 1841 and 1842, the electronic device 200 according to an embodiment may generate the second compensation map M2 based on the determination that the second condition is satisfied (e.g., the result of step 1820 corresponds to step 1822), and may control the rollable display 230 to display the compensated image data based on the second compensation map M2. The second compensation map M2 according to an embodiment may be a data group in which the burn-in compensation data for the whole display area 1210 of the rollable display 230 is calculated with uniform resolution.

In steps 1851 and 1852, the electronic device 200 according to an embodiment may generate the first compensation map M1 and the second compensation map M2 based on the determination that the third condition is satisfied (e.g., the result of step 1820 corresponds to step 1823), and may control the rollable display 230 to display the compensated image data based on the generated first compensation map M1 or second compensation map M2. According to an embodiment, if it is predicted that the burn-in occurs in the boundary area 1110 of the rollable display 230 and the remaining area excluding the boundary area 1110, the electronic device 200 may determine which area is the area having the greatest degree of burn-in. For example, the electronic device 200 may determine that the burn-in having the greatest degree of burn-in occurs in the boundary area 1110, or may determine that the burn-in having the greatest degree of burn-in occurs in the remaining area excluding the boundary area 1110. According to an embodiment, if it is determined that the burn-in having the greatest degree of burn-in occurs in the boundary area 1110, the electronic device 200 may generate the first compensation map M1, and may control the rollable display 230 to display the compensated image data based on the first compensation map M1. According to an embodiment, if it is determined that the burn-in having the greatest degree of burn-in occurs in the remaining area excluding the boundary area 1110, the electronic device 200 may generate the second compensation map M2, and may control the rollable display 230 to display the compensated image data based on the second compensation map M2.

Figure 19:
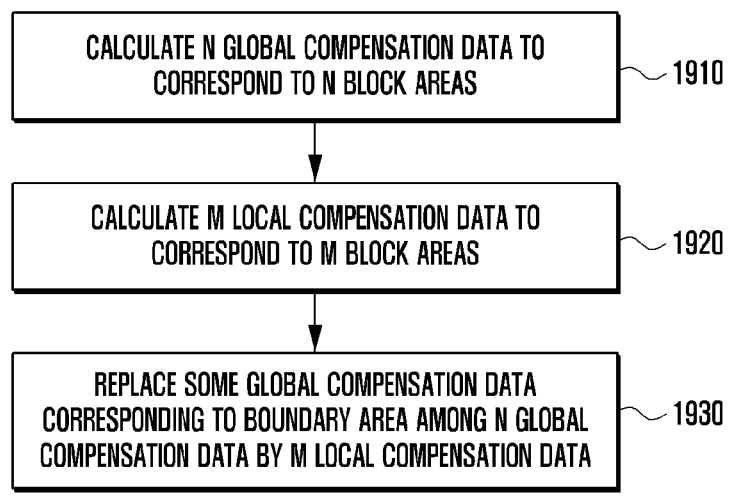
FIG. 19 is a flowchart illustrating an operation in which an electronic device generates a first compensation map according to an example embodiment.

FIG. 19 is a flowchart illustrating an operation in which an electronic device 200 generates a first compensation map M1 according to an embodiment. For example, FIG. 19 may be a flowchart illustrating the operation of the electronic device 200 for generating the first compensation map M1 illustrated in FIG. 14.

At least some of operations illustrated in FIG. 19 may be omitted. Before or after the at least some operations illustrated in FIG. 19, at least some operations mentioned with reference to other drawings may be additionally inserted in the document.

The operations illustrated in FIG. 19 may be performed by the electronic device 200 (e.g., electronic device 101 of FIG. 1 and/or processor 120 of FIG. 1) or may be performed by the DDI (e.g., DDI 930 of FIG. 9) of the electronic device 200. In an embodiment, the memory 130 (e.g., memory 130 of FIG. 1) of the electronic device 200, when executed, may store therein instructions for causing the processor 120 to perform at least some operations illustrated in FIG. 19.

The operation flowchart of the electronic device 200 illustrated in FIG. 19 may at least partly similar to the flowchart illustrated in FIG. 16, or may include other embodiments. Hereinafter, different or unexplained operations of the electronic device 200 will be described with reference to FIG. 19.

In step 1910, the electronic device 200 (e.g., electronic device 200 of FIG. 1) according to an embodiment may divide the whole display area 1210 of the rollable display 230 into n first block areas b1, and may calculate the global compensation data being mapped for the respective first block areas b1. For example, the global compensation data may be n global compensation data calculated to correspond to the n first block areas b1 through dividing of the whole display area 1210 with the resolution of a*b.

In step 1920, the electronic device 200 according to an embodiment may divide the boundary area 1110 (e.g., boundary area 1110 of FIG. 11) of the rollable display 230 into m second block areas b2, and may calculate the local compensation data being mapped for the respective second block areas b2. For example, the local compensation data may be m local compensation data calculated to correspond to the m second block areas b2 through dividing of the boundary area 1110 of the rollable display 230 with the resolution of c*d.

In step 1930, the electronic device 200 according to an embodiment may replace some global compensation data corresponding to the boundary area 1110 among the n global compensation data by the m local compensation data. Accordingly, the compensation data corresponding to the boundary area 1110 of the first compensation map M1 may be calculated with the precise resolution as compared with the compensation data corresponding to other areas excluding the boundary area 1110. Since the electronic device 200 according to an embodiment calculates the compensation data corresponding to the boundary area 1110 with the precise resolution as compared with other areas, the burn-in phenomenon for the boundary area 1110 can be prevented or reduced from being visually perceived by the user's naked eye.

Figure 20:
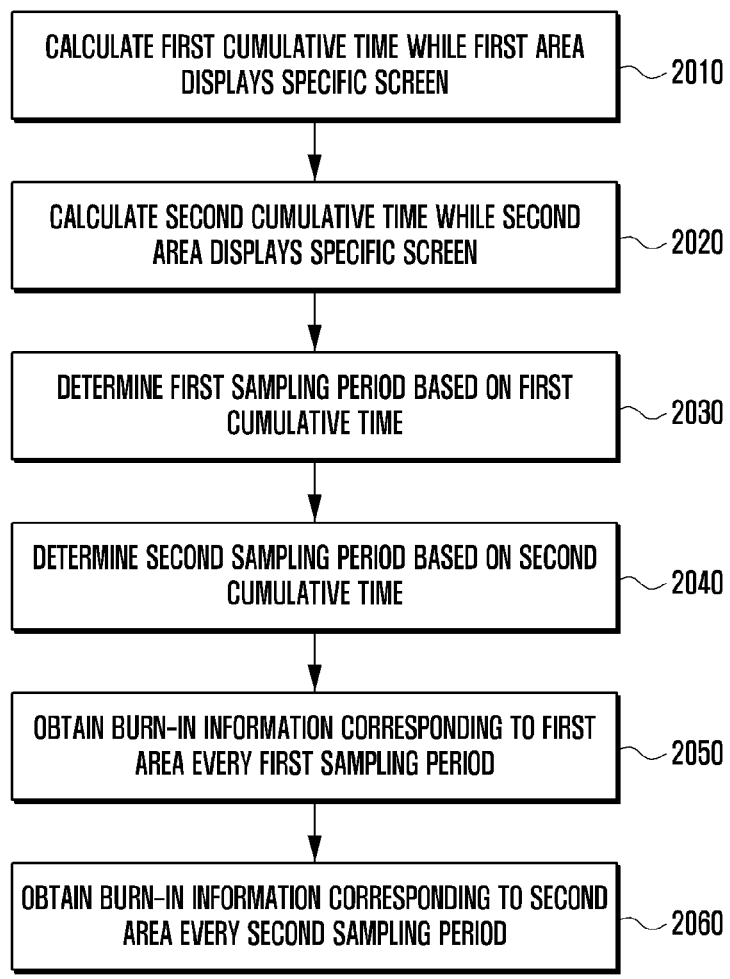
FIG. 20 is a flowchart illustrating an operation in which an electronic device varies a sampling period according to an example embodiment.

FIG. 20 is a flowchart illustrating an operation in which an electronic device 200 varies a sampling period according to an embodiment.

At least some of operations illustrated in FIG. 20 may be omitted. Before or after the at least some operations illustrated in FIG. 20, at least some operations mentioned with reference to other drawings may be additionally inserted in the document.

The operations illustrated in FIG. 20 may be performed by the electronic device 200 (e.g., electronic device 101 of FIG. 1 and/or processor 120 of FIG. 1) or may be performed by the DDI (e.g., DDI 930 of FIG. 9) of the electronic device 200. In an embodiment, the memory 130 (e.g., memory 130 of FIG. 1) of the electronic device 200, when executed, may store therein instructions for causing the processor 120 to perform at least some operations illustrated in FIG. 20.

The operation flowchart of the electronic device 200 illustrated in FIG. 20 may at least partly similar to the flowchart illustrated in FIG. 16, or may include other embodiments. Hereinafter, different or unexplained operations of the electronic device 200 will be described with reference to FIG. 20.

In step 2010, the electronic device 200 (e.g., electronic device 101 of FIGS. 1 and/or 200 of FIG. 2) according to an embodiment may calculate the first cumulative time while the first area 231 displays a specific screen. According to an embodiment, the electronic device 200 may calculate a relative ratio of the time while the first area 231 of the whole display area 1210 including the first area 231 and the second area 232 of the rollable display 230 is used. According to an embodiment, the electronic device 200 may calculate the ratio of the time while only the first area 231 displays the specific screen to the total usage time from the time when the rollable display 230 was produced up to the present. For example, the electronic device 200 may determine that the time while only the first area 231 displays the specific screen corresponds to about 70% of the total usage time of the rollable display 230. In this case, it may be considered that the time while the second area 232 displays the specific screen corresponds to about 30% of the total usage time of the rollable display 230. In another embodiment, the electronic device 200 may initialize the first cumulative time every designated time period, and may calculate the first cumulative time while the first area 231 displays the specific screen from the initialized time point. In another embodiment, the electronic device 200 may adaptively vary the first sampling period in accordance with the change of user's habits of using the electronic device 200 (e.g., usage pattern) through initialization of the first cumulative time every designated time period.

In step 2020, the electronic device 200 according to an embodiment may calculate the second cumulative time while the second area displays the specific screen. According to an embodiment, the electronic device 200 may calculate a relative ratio of the time while the second area 232 of the whole display area 1210 including the first area 231 and the second area 232 of the rollable display 230 is used. According to an embodiment, the electronic device 200 may calculate the ratio of the time while the second area 232 displays the specific screen to the total usage time from the time when the rollable display 230 was produced up to the present. In another embodiment, the electronic device 200 may adaptively vary the second sampling period in accordance with the change of the user's habits of using the electronic device 200 (e.g., usage pattern) through initialization of the second cumulative time every designated time period.

In step 2030, the electronic device 200 according to an embodiment may determine the first sampling period based on the first cumulative time. According to an embodiment, the electronic device 200 may determine the first sampling period in proportion to the amount of the first cumulative time. According to an embodiment, the electronic device 200 may set the first sampling period to be longer as the first cumulative time while the first area 231 displays the specific screen alone becomes longer.

In step 2040, the electronic device 200 according to an embodiment may determine the second sampling period based on the second cumulative time. According to an embodiment, the electronic device 200 may determine the second sampling period in proportion to the amount of the second cumulative time. According to an embodiment, the electronic device 200 may set the second sampling period to be longer as the second cumulative time while the second area 232 displays the specific screen becomes longer. "Based on" as used herein covers based at least on.

According to an embodiment, the second sampling period may be smaller than or equal to the first sampling period. The electronic device 200 according to an embodiment includes a form factor structure in which an open/closed state transition (e.g., transition between the first state and the second state) is possible, and if the open/closed state transition of the electronic device 200 occurs within a time that is shorter than the second sampling period, the burn-in information for the second area 232 may not be obtained. For example, a specific user may transition the electronic device 200 from the first state to the second state in about 8 seconds or less, and then may transition the electronic device 200 again from the second state to the first state. If the second sampling period is set to about 10 seconds, in the above user scenario, the electronic device 200 may be unable to obtain the burn-in information for the second area 232. For example, although the second area 232 of the rollable display 230 displays a specific screen for about 8 seconds or less, the electronic device 200 may be unable to obtain the aging factor for the second area 232. If the second sampling period is set to about 5 seconds, in the above user scenario, the electronic device 200 may obtain the burn-in information for the second area 232. Accordingly, the second sampling period may be set to be smaller than or equal to the first sampling period, and may be adaptively set depending on the change of user's habits of using the electronic device 200 (e.g., usage pattern). For example, a first user may habitually use the second state of the electronic device 200 only for a short time, and in this case, the electronic device 200 may set the second sampling period to a relatively short time (e.g., about 5 seconds). For example, a second user may habitually use the second state of the electronic device 200 for a long time, and in this case, the electronic device 200 may set the second sampling period to a relatively long time (e.g., about 10 seconds).

In step 2050, the electronic device 200 according to an embodiment may obtain burn-in information corresponding to the first area 231 every first sampling period. The electronic device 200 (e.g., sampling module 1021 of the processor 120) according to an embodiment may configure n block areas by scaling the resolution of the whole display area 1210 of the rollable display 230 as the resolution of a*b, and may store history information of aging factors corresponding to the some block areas corresponding to the first area 231 among the n block areas as the global burn-in information. The electronic device 200 (e.g., including sampling module 1021 of the processor 120) according to an embodiment may configure m block areas by scaling the resolution of the boundary area 1110 (e.g., boundary area 1110 of FIG. 11) located between the first area 231 and the second area 232 and having a designated width W4 as the resolution of c*d, and may store history information of aging factors corresponding to some block areas corresponding to the first area 231 among the m block areas as the local burn-in information. As indicated herein, each "module" herein may comprise circuitry.

In step 2060, the electronic device 200 according to an embodiment may obtain burn-in information corresponding to the second area 232 every second sampling period. The electronic device 200 (e.g., including sampling module 1021 of the processor 120) according to an embodiment may configure n block areas by scaling the resolution of the whole display area 1210 of the rollable display 230 as the resolution of a*b, and may store history information of aging factors corresponding to the some block areas corresponding to the second area 232 among the n block areas as the global burn-in information. The electronic device 200 (e.g., including sampling module 1021 of the processor 120) according to an embodiment may configure m block areas by scaling the resolution of the boundary area 1110 located between the first area 231 and the second area 232 and having a designated width as the resolution of c*d, and may store history information of aging factors corresponding to some block areas corresponding to the second area 232 among the m block areas as the local burn-in information.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a housing;
a rollable display configured to be supported by the housing and provided with a display area whose area is configured to be adjusted via a movement of at least a part of the housing in a first direction, the rollable display including a first area fixedly viewable to an outside and a second area configured to be variably viewable to the outside based on the movement of the at least part of the housing;
a memory configured to store therein burn-in information of the rollable display, the memory including:
a first memory area configured to store global burn-in information corresponding to n designated block areas divided from a whole area of the display area including the first area and the second area, and
a second memory area configured to store local burn-in information corresponding to m designated block areas divided from a boundary area located on a boundary between the first area and the second area of the rollable display and having a designated width; and
a processor,
wherein the processor is configured to:
obtain the global burn-in information and the local burn-in information for each designated sampling period and control to store the global burn-in information and the local burn-in information in the first memory area and the second memory area, respectively,
predict whether a burn-in occurs at least partly in the whole area of the display area based on a result of analyzing the global burn-in information,
predict whether the burn-in occurs at least partly in the boundary area of the display area based on a result of analyzing the local burn-in information,
generate a first compensation map including local compensation data to correspond to the m block areas when it is predicted that the burn-in occurs at least partly in the boundary area,
generate a second compensation map including global compensation data to correspond to the n block areas when it is predicted that the burn-in occurs at least partly in a remaining area of the whole area excluding the boundary area, and
control the rollable display to display compensated image data based on the first compensation map and/or the second compensation map.

2. The electronic device of claim 1, wherein the processor is configured to generate the first compensation map, when it is predicted that the burn-in occurs at least partly in the boundary area, at least by:
calculating n pieces of global compensation data to correspond to the n block areas, respectively;
calculating m pieces of local compensation data to correspond to the m block areas, respectively; and
replacing some of the n pieces of global compensation data corresponding to the boundary area by the m pieces of local compensation data.

3. The electronic device of claim 2, wherein the processor is configured to:
  predict that the burn-in does not occur in the boundary area and determine whether a first condition is satisfied, in which the burn-in occurs at least partly in the remaining area of the whole area excluding the boundary area,
  compensate for the image data based on the second compensation map when it is determined that the first condition is satisfied, and
  control the rollable display to display the compensated image data based on the second compensation map.

4. The electronic device of claim 2, wherein the processor is configured to:
  predict that the burn-in occurs at least partly in the boundary area and determine whether a second condition is satisfied, in which the burn-in does not occur in the remaining area of the whole area excluding the boundary area,
  compensate for the image data based on the first compensation map when it is determined that the second condition is satisfied, and
  control the rollable display to display the compensated image data based on the first compensation map.

5. The electronic device of claim 2, wherein the processor is configured to:
  predict that the burn-in occurs at least partly in the boundary area and determine whether a third condition is satisfied, in which the burn-in occurs at least partly in the remaining area of the whole area excluding the boundary area,
  calculate a first score representing the degree of burn-in predicted in the boundary area and a second score representing the degree of burn-in predicted in the remaining area of the whole area when it is determined that the third condition is satisfied, and
  control to display the compensated image data based on the first compensation map or the second compensation map based on a result of comparing the first score and the second score with each other.

6. The electronic device of claim 5, wherein the processor is configured to control the rollable display to display the compensated image data based on the first compensation map based on the first score being larger than the second score.

7. The electronic device of claim 5, wherein the processor is configured to control the rollable display to display the compensated image data based on the second compensation map when the second score is larger than the first score.

8. The electronic device of claim 1, wherein the processor is configured to:
  calculate a first cumulative time while the first area of the rollable display displays a specific screen,
  calculate a second cumulative time while the second area of the rollable display displays a specific screen,
  determine a first sampling period based on the first cumulative time,
  determine a second sampling period based on the second cumulative time,
  obtain the global burn-in information and the local burn-in information corresponding to the first area for each of the first sampling period, and
  obtain the global burn-in information and the local burn-in information corresponding to the second area for each of the second sampling period.

9. The electronic device of claim 8, wherein the processor is configured to set the second sampling period to be smaller than or equal to the first sampling period.

10. The electronic device of claim 8, wherein the processor is configured to initialize the first cumulative time and the second cumulative time for each designated time period.

11. A method for driving an electronic device including: a rollable display comprising a display area whose area is configured to be adjusted with a movement of at least a part of a housing in a first direction, the rollable display including a first area fixedly exposed to an outside and a second area configured to be variably exposed to the outside based on movement of the housing; and a memory including a first memory area configured to store global burn-in information corresponding to n designated block areas divided from a whole area of the display area including the first area and the second area, and a second memory area configured to store local burn-in information corresponding to m designated block areas divided from a boundary area located on a boundary between the first area and the second area of the rollable display and having a designated width, the method comprising:
  obtaining the global burn-in information and the local burn-in information for each designated sampling period and storing the global burn-in information and the local burn-in information in the first memory area and the second memory area, respectively;
  predicting whether a burn-in occurs at least partly in the whole area of the display area based on a result of analyzing the global burn-in information;
  predicting whether the burn-in occurs at least partly in the boundary area of the display area based on a result of analyzing the local burn-in information;
  generating a first compensation map including local compensation data calculated to correspond to the m block areas based on it being predicted that the burn-in occurs at least partly in the boundary area;
  generating a second compensation map including global compensation data calculated to correspond to the n block areas based on it being predicted that the burn-in occurs at least partly in a remaining area of the whole area excluding the boundary area; and
  controlling the rollable display to display compensated image data based on the first compensation map and/or the second compensation map.

12. The method of claim 11, wherein generating the first compensation map comprises:
  calculating n pieces of global compensation data to correspond to the n block areas, respectively;
  calculating m pieces of local compensation data to correspond to the m block areas, respectively; and
  replacing some of the n pieces of global compensation data corresponding to the boundary area by the m pieces of local compensation data.

13. The method of claim 12, further comprising:
  predicting that the burn-in does not occur in the boundary area and determining whether a first condition is satisfied, in which the burn-in occurs at least partly in the remaining area of the whole area excluding the boundary area;
  compensating for the image data based on the second compensation map based on it being determined that the first condition is satisfied; and
  controlling the rollable display to display the compensated image data based on the second compensation map.

14. The method of claim 12, further comprising:
predicting that the burn-in occurs at least partly in the boundary area and determining whether a second condition is satisfied, in which the burn-in does not occur in the remaining area of the whole area excluding the boundary area;
compensating for the image data based on the first compensation map based on it being determined that the second condition is satisfied; and
controlling the rollable display to display the compensated image data based on the first compensation map.

15. The method of claim 12, further comprising:
predicting that the burn-in occurs at least partly in the boundary area and determining whether a third condition is satisfied, in which the burn-in occurs at least partly in the remaining area of the whole area excluding the boundary area;
calculating a first score representing the degree of burn-in predicted in the boundary area and a second score representing the degree of burn-in predicted in the remaining area of the whole area based on it being determined that the third condition is satisfied; and
controlling to display the compensated image data based on the first compensation map and/or the second compensation map based on a result of comparing the first score and the second score with each other.

16. The method of claim 15, further comprising controlling the rollable display to display the compensated image data based on the first compensation map based on it being determined that the first score is larger than the second score.

17. The method of claim 15, further comprising controlling the rollable display to display the compensated image data based on the second compensation map based on it being determined that the second score is larger than the first score.

18. The method of claim 11, further comprising:
calculating a first cumulative time while the first area of the rollable display displays a specific screen;
calculating a second cumulative time while the second area of the rollable display displays a specific screen;
determining a first sampling period based on the first cumulative time;
determining a second sampling period based on the second cumulative time;
obtaining the global burn-in information and the local burn-in information corresponding to the first area for each of the first sampling period; and
obtaining the global burn-in information and the local burn-in information corresponding to the second area for each of the second sampling period.

19. The method of claim 18, further comprising setting the second sampling period to be smaller than or equal to the first sampling period.

20. The method of claim 18, further comprising initializing the first cumulative time and the second cumulative time for each designated time period.

\* \* \* \* \*